United States Patent [19]
Tremblay

[11] Patent Number: 5,463,632
[45] Date of Patent: Oct. 31, 1995

[54] TESTING UNIT BY WHICH COMMUNICATION LINKS CAN BE SELECTED AND TESTED, AND METHOD THEREOF

[75] Inventor: Gilles Tremblay, Jonquière, Canada

[73] Assignee: Hydro-Quebec, Montreal, Canada

[21] Appl. No.: 280,570

[22] Filed: Jul. 26, 1994

Related U.S. Application Data

[63] Continuation of Ser. No. 806,630, Dec. 13, 1991, abandoned.

[51] Int. Cl.$^6$ ................................................. G06F 11/00
[52] U.S. Cl. ............................................................. 371/20.1
[58] Field of Search .......................... 371/8.1, 8.2, 10.1, 371/11.2, 20.1

[56] References Cited

U.S. PATENT DOCUMENTS

| | | | |
|---|---|---|---|
| 3,920,975 | 11/1975 | Bass | 371/20.5 |
| 4,006,320 | 2/1977 | Märkl | 330/2 |
| 4,055,808 | 10/1977 | Holsinger et al. | 375/8 |
| 4,076,961 | 2/1978 | Holsinger et al. | 379/2 |
| 4,385,384 | 5/1983 | Rosbury et al. | 371/20.6 |
| 4,419,751 | 12/1983 | Cholat-Namy et al. | 370/13 |
| 4,545,011 | 10/1985 | Lyon et al. | 395/200 |
| 4,545,013 | 10/1985 | Lyon et al. | 395/200 |
| 4,611,101 | 9/1986 | Walter et al. | 379/6 |
| 4,682,347 | 7/1987 | Lynch | 379/29 |
| 4,918,623 | 4/1990 | Lockitt et al. | 364/514 |
| 4,937,851 | 6/1990 | Lynch et al. | 379/6 |
| 4,945,554 | 7/1990 | Krause et al. | 379/10 |
| 4,964,036 | 10/1990 | Azevedo, Jr. et al. | 395/575 |
| 4,998,240 | 3/1991 | Williams | 370/17 |
| 5,027,343 | 6/1991 | Chan et al. | 370/17 |

FOREIGN PATENT DOCUMENTS

| | | |
|---|---|---|
| 3110633 | 9/1982 | Germany . |
| 3127508 | 1/1983 | Germany . |

OTHER PUBLICATIONS

Bretschneider et al., "Sonder–und Datenleitungen Schnell im Griff", *Telcom Report*, vol. 14, No. 5, Sep./Oct. 1991.

*Primary Examiner*—Robert W. Beausoliel, Jr.
*Assistant Examiner*—Phillip F. Vales
*Attorney, Agent, or Firm*—Foley & Lardner

[57] ABSTRACT

A testing unit allows an operator to select and test communication links of a communication system between an intermediate station and remote stations. Each remote station contains another communication link for establishing a second communication system between the intermediate station and the remote stations. The testing unit contains a first communication link for receiving and transmitting signals generated from a computer. This first communication link is part of the second communication system. The testing unit also includes a control unit which is connected to the first communication link for receiving and transmitting signals therefrom, and a second communication link which is connected to the control unit for receiving and transmitting signals therefrom. The second communication link is part of the second communication system so that communication can be established between the computer and the remote stations via the intermediate station by means of the second communication system. Finally, the testing unit includes a switching system controlled by the control unit and interconnecting the corresponding communication links with a generating and measuring device, whereby the operator can select at least one of the links between the intermediate station and one of the remote stations by sending command signals via the second communication system, and monitor a test procedure on the link that has been selected via the second communication system.

10 Claims, 5 Drawing Sheets

TESTING UNIT BY WHICH COMMUNICATION LINKS CAN BE SELECTED AND TESTED, AND METHOD THEREOF

This application is a continuation of application Ser. No. 07/806,630, filed Dec. 13, 1991, now abandoned.

BACKGROUND OF THE INVENTION

The present invention relates to testing units by which an operator can select and test communication links of a communication system that links an intermediate station to remote stations, and to a method of testing these links.

Known in the art, there is the U.S. Pat. No. 4,998,240 granted on Mar. 5, 1991, and naming Clifton B. WILLIAMS as the inventor. This patent describes a system and a method for remote and unattended testing of a ISDN protocol at a central office. An object of this invention is to test customer ISDN lines without the necessity to dispatch personnel to a customer site or central office.

In the system described in U.S. Pat. No. 4,998,240, the link connecting the equipments to be verified is also used for sending command signals relating to the test to be performed. Accordingly, if the link is broken or cannot efficiently convey the data signal, then it is not possible to do a test. Also, the nature of the tests that are performed is very specific and relates to the verification of transmission protocol and data integrity. These tests do not provide any information on the quality of the link itself. Also, the system can only operate with AT&T (trademark) equipment and uses functions already programmed in the system.

Also known in the art, there is the U.S. Pat. No. 4,055,808 granted on Oct. 25, 1977, naming Jerry L. HOLSINGER et al. as inventors. In this patent, there is described an intermediate location testing unit for connection to a communication unit located at an intermediate location in a data communication network. The network additionally includes first data transmission means for conveying signals to an upstream port of the communication network from a central location. The communication unit also includes a downstream port for conveying signals to other data transmission means that connect to remote locations. The signals have first characteristics at the upstream port and second characteristics at the downstream port. The data communication network further includes a central testing unit at the central location for transmitting a test control word having a command portion and an address portion. The system uses an address command protocol within a test control word circulating within the communication data network. With this system, it is not possible to verify circuits that are out of order to the point where they cannot receive or transmit the test control word. There is also no direct communication between the central station and the remote stations.

Also known in the art, there are the following U.S. patents describing different testing apparatus and methods for testing a communication system:

U.S. Pat. No. 5,027,343 (CHAN et al.)
U.S. Pat. No. 4,945,554 (KRAUSE et al.)
U.S. Pat. No. 4,937,851 (LYNCH et al.)
U.S. Pat. No. 4,918,623 (LOCKITT et al.)
U.S. Pat. No. 4,682,347 (LYNCH)
U.S. Pat. No. 4,611,101 (WALTER et al.)
U.S. Pat. No. 4,419,751 (CHOLAT-NAMY et al.)
U.S. Pat. No. 4,076,961 (HOLSINGER et al.)

One drawback with all of these testing apparatus and methods resides in the fact that if a communication link of the system is totally out of order or deficient to the point where it cannot transmit information, it is not possible to perform a test on this link.

Accordingly, an object of the present invention is to provide a testing unit and a testing method by which an operator can select and test communication links of a communication system even if this communication link is out of order or broken down.

The objects, advantages and other features of the present invention will become more apparent upon reading of the following non restrictive description of a preferred embodiment thereof, given for the purpose of exemplification only with reference to the accompanying drawings.

SUMMARY OF THE INVENTION

According to the present invention, there is provided a testing unit by which an operator can select and test communication links of a first communication system that links an intermediate station to remote stations. The testing unit is located at the intermediate station. Each of the remote stations are connected to another communication link to establish a second communication system between the intermediate station and the remote stations. Each of the remote stations contain a control module which is connected to the second communication system from which command signals can be received. Each of the control modules are also connected to the corresponding communication links of the first system so that at least one of the links can be selected between the intermediate station and one of the remote stations the testing unit comprises:

a first communication link for receiving and transmitting signals generated from a computer, said first communication link being part of said second communication system;

a control unit connected to said first communication link for receiving and transmitting signals therefrom;

a second communication link connected to said control unit for receiving and transmitting signals therefrom, said second communication link being part of said second communication system so that communication can be established between said computer and said remote stations via said intermediate station by means of said second communication system;

a signal generating and measuring device connected to said control unit, having an input for receiving a signal to be measured and an output for generating a predetermined signal;

a switching system controlled by said control unit and interconnecting the corresponding communication links of the first system with said generating and measuring device, by which one of the corresponding communication links can be selected by said control unit and connected to said input and output of said signal generating and measuring device; whereby said operator can select at least one of said links between said intermediate station and one of said remote stations by sending command signals via said second communication system, and monitor a test procedure on said link that has been selected by said operator via said second communication system.

Also according to the present invention, there is provided a method by which an operator provided with a computer can select and test communication links of a communication system that links an intermediate station to remote stations. The intermediate station is provided with a testing unit equipped with a first communication link for communication with the computer, and a second communication link for communication with the remote stations. The method comprises the steps of:

(a) establishing a first connection between said computer and said intermediate station, upon commands issued from said computer;

(b) establishing a second connection between said intermediate station and one of said remote stations that has been selected by said operator, upon commands issued from said computer for selecting a communication link between said intermediate station and the remote station that has been selected;

(c) sending command signals to said testing unit via said first connection for initiating a test procedure on said communication link that has been selected, upon commands issued from said computer; and (d) transmission of results of said test procedure from said testing unit to said computer via said first connection, whereby an operator can select a particular communication link by means of step (b), initiate said test procedure on said particular link by means of step (c) and be informed of the result of said test procedure by means of step (d).

DETAILED DESCRIPTION OF THE DRAWINGS

Figure 1:
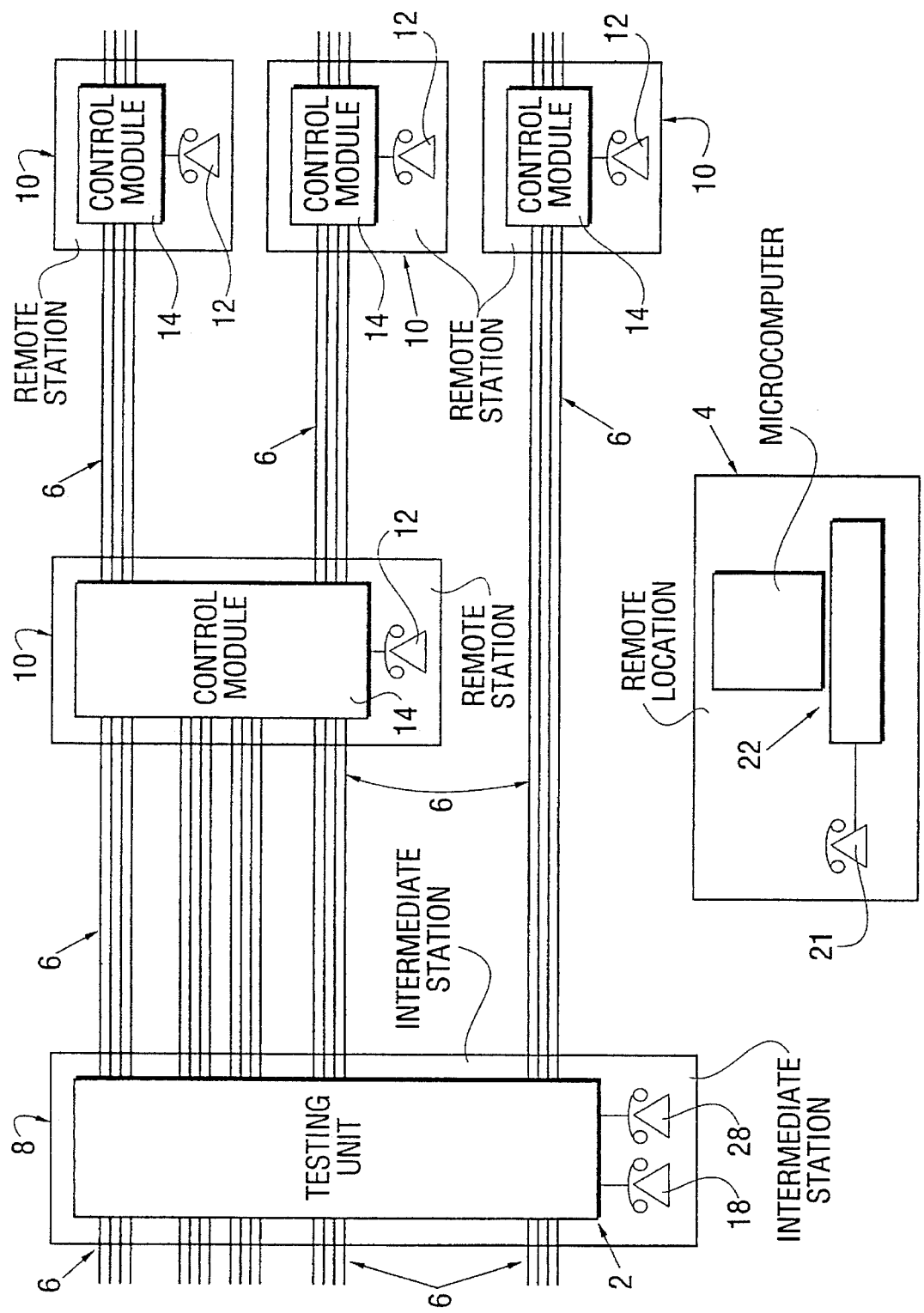
FIG. 1 is a block diagram illustrating a communication system including the necessary means to perform the method according to the present invention.

Referring now to FIG. 1, there is shown a testing unit 2 by which an operator situated at a remote location 4 can select and test communication links 6 of a first communication system that links an intermediate station 8 to remote stations 10. Each communication link is made of two transmission wires and two reception wires. The testing unit 2 is located at the intermediate station 8. Each of the remote stations 10 comprises a modem 12 to establish a second communication system between the intermediate station 8 and the remote stations 10. Each of the remote stations 10 comprises a control module 14 for receiving command signals from its corresponding modem 12. The control module 14 is connected to the corresponding communication links 6 so that at least one of the links 6 can be selected between the intermediate station 8 and one of the remote stations 10.

Figure 2:
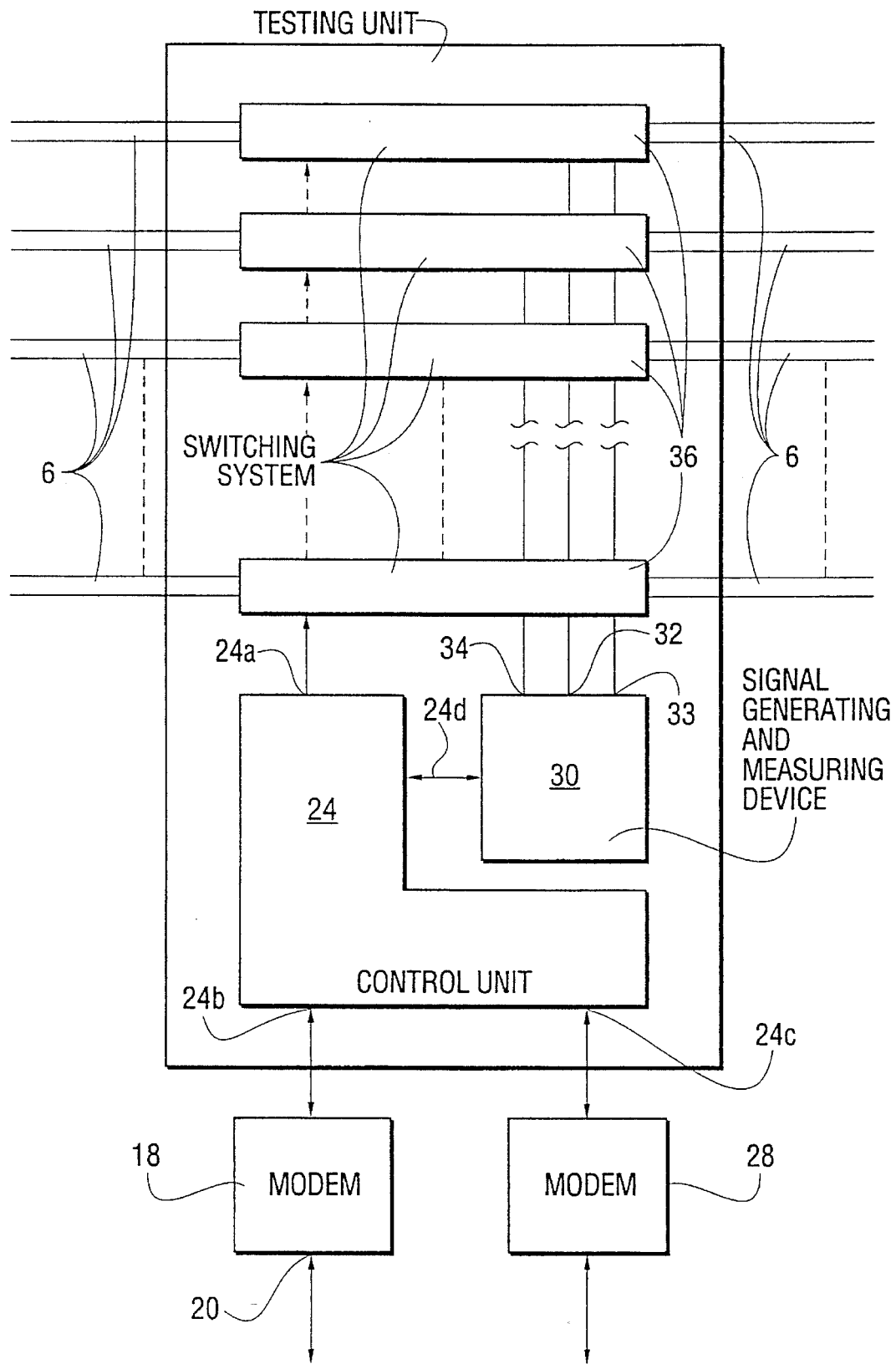
FIG. 2 is a block diagram illustrating with more details the testing unit shown in FIG. 1.

Referring now to FIGS. 1 and 2, the testing unit 2 comprises a first modem 18 for receiving and transmitting signals generated from a computer 22 equipped with a modem 21 situated at the remote location 4. The first modem 18 at port 24b is part of the second communication system.

The testing unit comprises a control unit 24 at port 24c connected to the first modem 18 for receiving and transmitting signals therefrom. A second modem 28 is provided. It is connected to the control unit 24 for receiving and transmitting signals therefrom. The second modem 28 is part of the second communication system so that communication can be established between the remote location 4 and the remote stations 10 via the intermediate station 8 by means of the modems 12 of the second communication system.

A signal generating and measuring device 30 is provided. It is connected to the control unit 24 at point 24d and has inputs 32 and 33 for receiving a signal to be measured and an output 34 for generating a predetermined signal.

The testing unit 2 also comprises a switching system 36 controlled by the control unit 24 with a connection 24a and interconnecting the corresponding communication links 6 with the generating and measuring device 30, by which one of the corresponding communication links 6 can be selected by the control unit 24 and connected to the inputs 32 and 33 and output 34 of the signal generating and measuring device 30, whereby the operator can select at least one of the links 6 between the intermediate station 8 and one of the remote stations 10 by sending command signals via the second communication system, and monitor a test procedure on the link 6 that has been selected by the operator via the second communication system.

Figure 3:
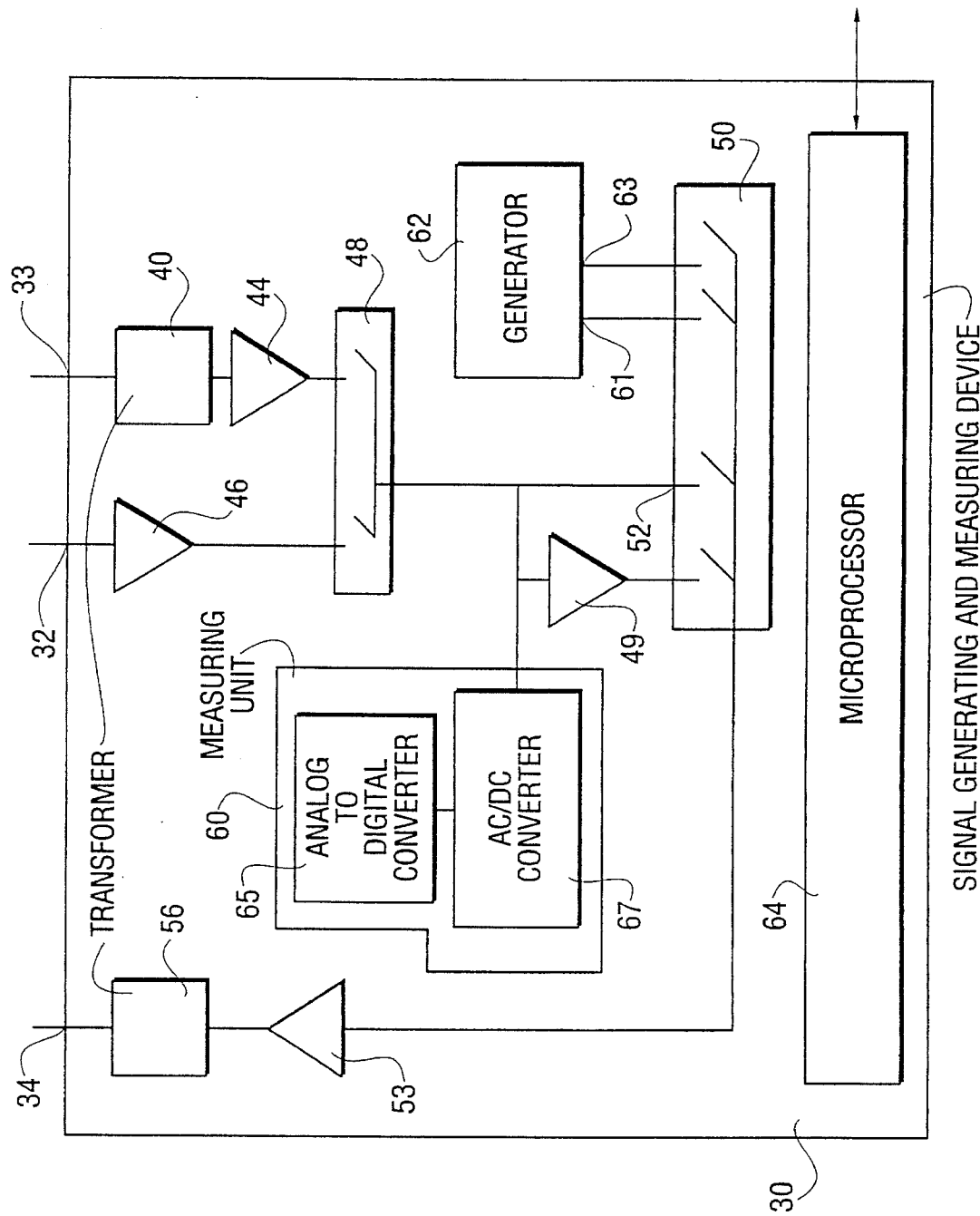
FIG. 3 is a block diagram illustrating with more details the signal generating and measuring device shown in FIG. 2.

Referring now more specifically to FIGS. 2 and 3, the inputs 32 and 33 of the signal generating and measuring device 30 comprises a tap input 32 for receiving a tap connection of the communication link 6 that has been selected and a direct input 33 for receiving the communication link 6 that has been selected. The signal generating and measuring device 30 comprises first coupling transformer 40 having an input connected to the direct input 33, first and second amplifiers 44 and 46 having high impedance inputs connected respectively to an output of the transformer 40 and the tap input 32, first switching device 48 having two inputs connected respectively to outputs of the first and second amplifiers 44 and 46, second switching device 50 having an input 52 connected to an output of the first switching device 48, and a third amplifier 53 having a high impedance input connected to the output of the second switching device 50. The signal generating and measuring device 30 also comprises a second coupling transformer 56 having an input connected to an output of the third amplifier 53, and an output connected to the output 34 of the signal generating and measuring device 30; a measuring unit 60 having an input connected to the output of the first switching device 48; a signal generator 62 having two outputs connected respectively to inputs of the second switching device 50; and a microprocessor 64 having an input connected to the control unit 24, and different connections (not shown in FIG. 3) with the switching devices 48 and 50, the measuring unit 60 and the signal generator 62, whereby the operator can monitor the test procedure by sending command signals to the microprocessor 64 via the second communication system.

It should be appreciated that the second communication system is constituted by telephone lines and modems. In FIG. 3, the connection between the microprocessor 64 and the control unit 24 is made by a RS 232 connection. The output of the first switching device 48 is also connected to an input of the second switching device 50 by means of an amplifier 49 having a gain of 16 db. The signal generator 62 is a programmable sinusoidal generator having a first output 61 of 0 db and a second output 63 of −8 db. The measuring unit 60 comprises a 8 bit analog-to-digital converter 65 and a AC/DC RMS converter 67. The coupling transformers 40 and 56 are 1:1 transformers. The generator 62 is capable of generating a sinusoidal wave signal having a frequency varying from 300 to 3000 Hz at 0 db and −8 db. The converter 67 converts an alternating signal into a DC signal which is the RMS value of the alternating signal.

Figure 4:
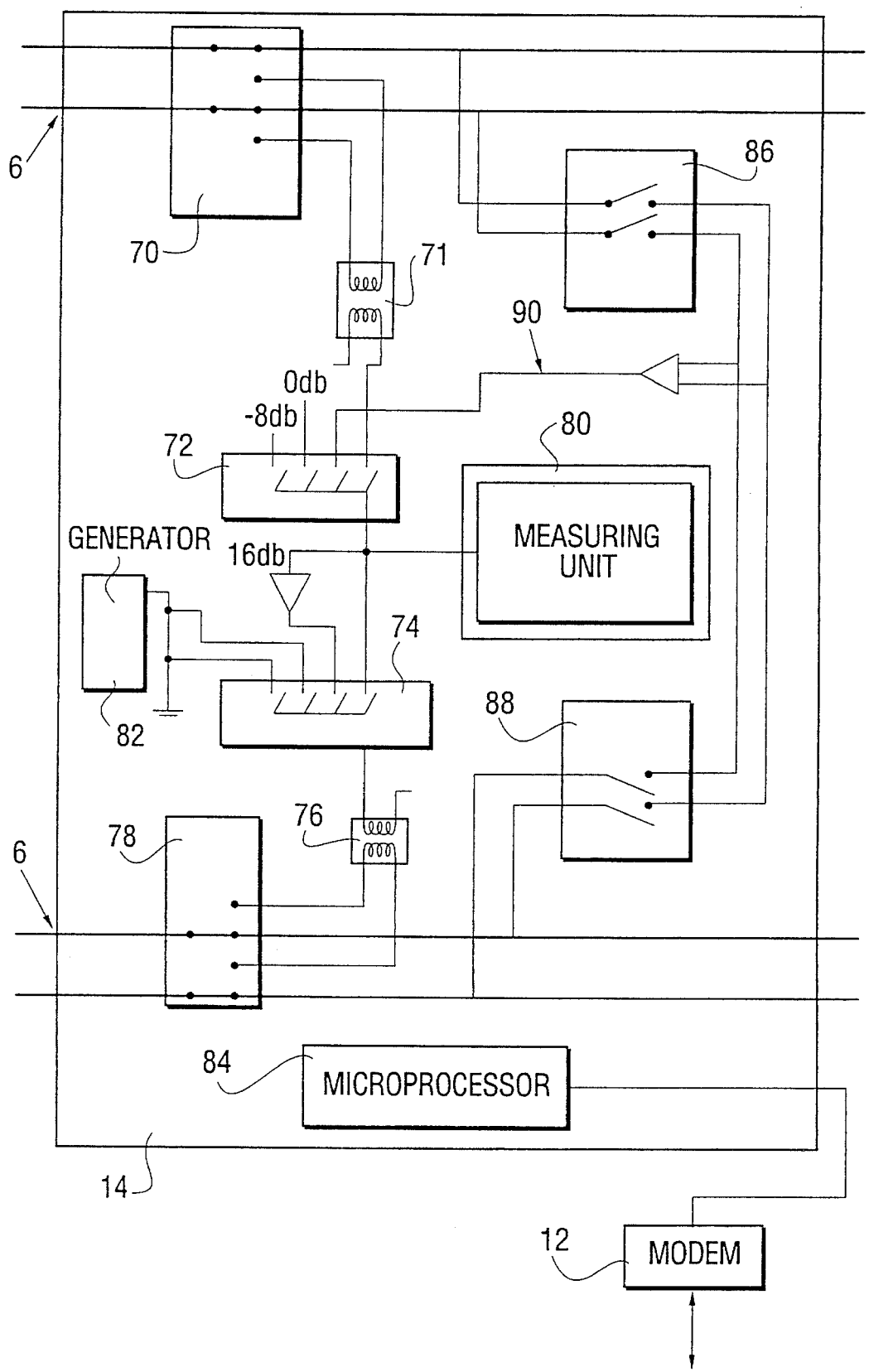
FIG. 4 is a block diagram illustrating with more details the control module of one of the remote stations shown in FIG. 1.

Referring now to FIG. 4, there is shown one of the control modules disposed at each of the remote stations. This control module 14 is connected to its corresponding modem 12. This control module 14 comprises first switching device 70 having an input connected in series with the corresponding communication link 6; a first coupling transformer 71 having an input connected to an output of the first switching device 70; second switching device 72 having an input connected to an output of the first coupling transformer 71; third switching device 74 having an input connected to an output of the second switching device 72; a second coupling transformer 76 having an input connected to an output of the third switching device 74; fourth switching device 78 having an input connected to an output of the second coupling transformer 76, and an output connected in series with the corresponding communication link 6; a measuring unit 80 having an input connected to the output of the second switching device 72; and a signal generator 82 having an output connected to an input of the third switching device 74. The control module 14 also comprises a microprocessor 84 connected to the corresponding modem 12, and different connections (not shown in this FIG. 4) with the switching devices 70, 72, 74 and 78, the measuring unit 80 and the signal generator 82, whereby the operator can monitor a test procedure at one of the remote stations 10 by sending command signals to the corresponding microprocessor 84 via the second communication system.

The control module 14 also comprises fifth switching device 86 having an input connected in parallel with the corresponding communication link 6; sixth switching device 88 having an input connected to an output of the fifth switching device 86, and an output connected to the corresponding communication link 6; and a tap connection 90 having an input connected to the output of the fifth switching device 86, and an output connected to an input of the second switching device 72. The microprocessor 84 has also different connections (not shown in this FIG. 4) with the fifth and sixth switching devices 86 and 88, whereby the operator can monitor additional test procedures at the remote stations 10 by sending command signals to the corresponding microprocessor 84 via the second communication system.

Figure 5:
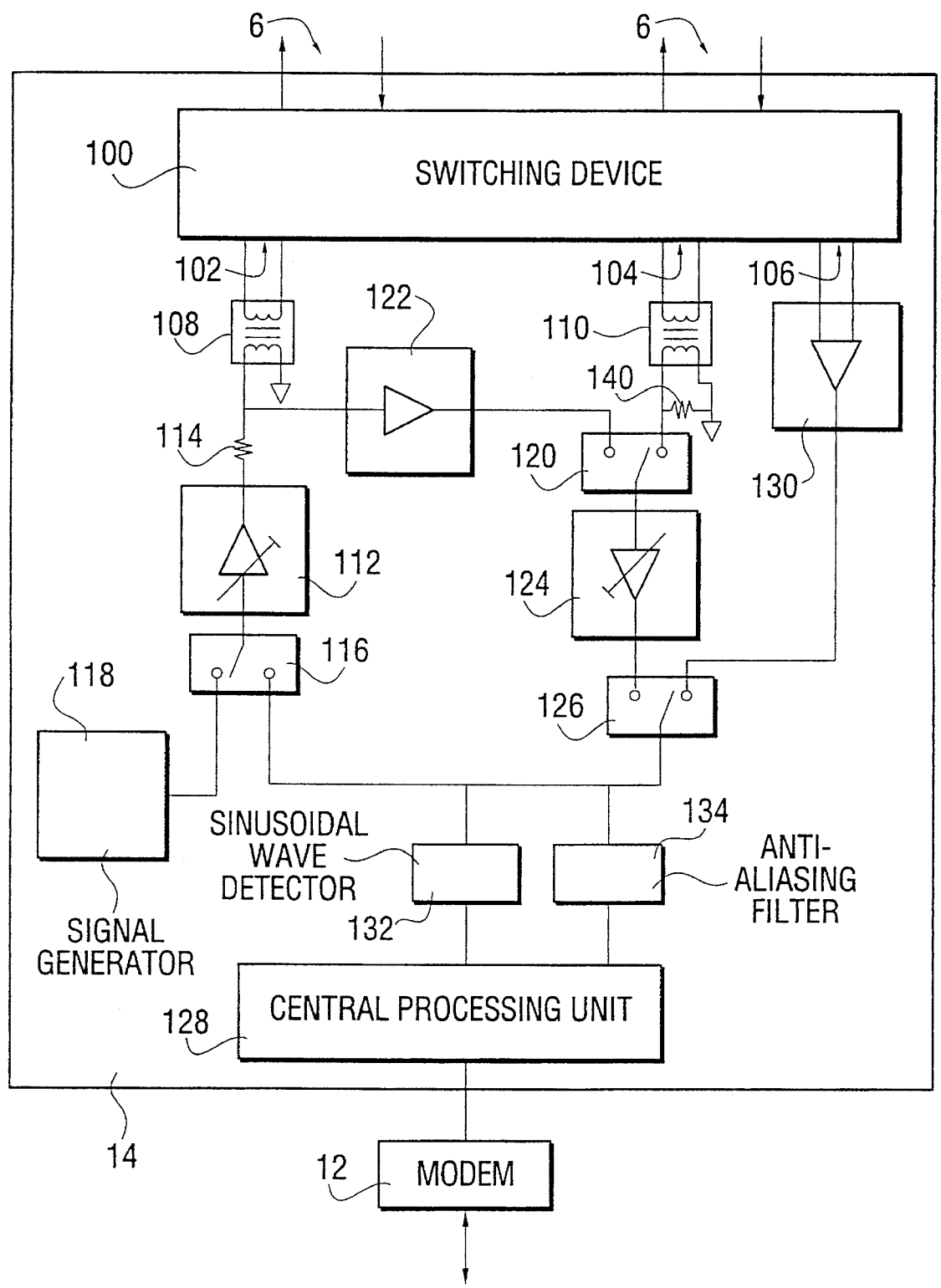
FIG. 5 is a block diagram illustrating with more details another embodiment of the control module of one of the remote stations shown in FIG. 1.

Referring now to FIG. 5, there is shown another embodiment of one of the control modules disposed at each of the remote stations. It should be appreciated that the portion of this circuit disposed between the switching device and the modem 12 can also be used to replace the signal generating and measuring device shown in FIG. 3. This control module 14 is connected to its corresponding modem 12. This control module 14 comprises a first switching device 100 having a four-connection input connected with one of the corresponding communication links 6. Each communication link 6 comprises two reception wires and two transmission wires. The switching device 100 also comprises a two-wire input 102, and a first two-wire output 104. A first coupling transformer 108 has an output connected to the two-wire input 102. A second coupling transformer 110 has an input connected to first two-wire output 104. A variable gain amplifier 112 has an output connected to an input of first transformer 108 via a resistor 114 of 600 ohms. A second switching device 116 has an output connected to an input of first amplifier 112. A signal generator 118 has an output connected to an input of second switching device 116. A third switching device 120 has a first input connected to the output of first transformer 108 via a buffer 122, and a second input connected to an output of second transformer 110. A second variable gain amplifier 124 has an input connected to an output of third switching device 120. A fourth switching device 126 has an input connected to an output of second amplifier 124, and an output connected to an input of second switching device 116.

The control module 14 also comprises a central processing unit 128 connected to the corresponding modem 12, and different connections (not shown in this FIG. 5) with the switching devices 100, 116, 120 and 126, the amplifiers 112 and 124, and the signal generator 118, whereby the operator can monitor a test procedure at one of the remote stations by sending command signals to the corresponding central processing unit 128 via the second communication system.

The control module 14 further comprises a differential amplifier 130 connected to a second output 106 of first switching device 100, and an output connected to a second input of fourth switching device 126; a sinusoidal wave detector 132 having an input connected to the output of fourth switching device 126, and an output connected to an input of central processing unit 128; and an anti-aliasing filter 134 having an input connected to the output of fourth switching device 126, and an output connected to an input of central processing unit 128.

A resistor 140 of 600 ohms is connected at the output of transformer 110. Variable gain amplifiers 112 and 124 have their gain controlled by the central processing unit 128. By means of switching device 126, the central processing unit 128 can select a different type of input signal. By means of switching device 120, the central processing unit 128 can select a normal measurement of the link or a noise measurement of the link. The filter 134 is needed for the sampling performed by the central processing unit. The sinusoidal wave detector 132 is needed for converting its input signal into a square wave signal. The buffer 122 is needed for measuring the noise on the selected link. The amplifier 130 is needed for performing a bridge measurement of the selected link.

With the equipments shown in these FIGS. 1 to 5, a method according to the present invention can be performed, by which an operator provided with a computer 22 equipped with a modem 21, situated at a remote location 4, can select and test communication links 6 of a communication system that links an intermediate station 8 to remote stations 10. The intermediate station 8 is provided with the testing unit 2 equipped with the first modem 18 for communication with the remote location 4, and a second modem 28 for communication with modems 12 located at the remote stations 10. The method comprises steps of (a) establishing a first connection between the modem 21 of the remote location 4 and the first modem 18 of the intermediate station 8, upon commands issued from the computer 22; (b) establishing a second connection between the second modem 28 of the intermediate station 8 and the modem 12 of one of the remote stations 10 that has been selected by the operator, upon commands issued from the computer 22 for selecting a communication link between the intermediate station 8 and the remote station that has been selected; (c) sending command signals to the testing unit 2 via the first connection for initiating a test procedure on the communication link that has been selected, upon commands issued from the computer 22; and (d) transmission of results of the test procedure from the testing unit 2 to the computer 22 via the first connection, whereby an operator can select a particular communication link by means of step (b), initiate the test procedure on the particular link by means of step (c) and be informed of the results of the test procedure by means of step (d).

The method can further comprise a step of sending command signals issued from the computer 22 to the intermediate station 8 via the first connection, and to the remote station that has been selected via the first and second connections, for temporarily disconnecting the communication link that has been selected from the communication system by means of switching devices present at the stations, so that the test procedure performed during step (c) can be a closed loop test procedure.

Each of the remote stations 10 is provided with a control module 14 connected between the corresponding modem 12 and to the corresponding communication links 6. The method can further comprise a step of sending command signals to the control module 14 of the remote station that has been selected via the first and second connections to initiate a test procedure from the remote station that has been selected over the communication link that has been selected, upon commands issued from the computer 22.

The present system and method can be specifically adapted to verify four-wire communication systems generally used for transmitting human voice and data. With the present system, it is possible to verify the links of a communication system by measuring the db level of a signal on each link, by generating different tone signals over each link, and by forming a closed loop circuit with a link to perform a closed loop test procedure. All of these operations can be initiated from a microcomputer situated anywhere where a tone telephone line is available and with the necessary devices for connecting the microcomputer to the tone telephone line.

The microcomputer can be an IBM (trademark) microcomputer or an IBM clone provided with a 80286 microprocessor with a monochrome or color V.G.A. type monitor. It has been found that a color monitor is preferable. An integrated or external modem capable of communicating at a 2400 baud and that is HAYES compatible is recommended. A 3½ or a 5¼ disk drive should be provided for loading the software. The computer should also be provided with a graphic adapter.

The intermediate station is provided with two modems having characteristics similar to the one mentioned above. These modems are connected respectively to different telephone lines. The testing unit of the intermediate station is connected to a switching system made of several banks of circuits, which are respectively equipped with a line adapter and an address decoder. The links to be verified are passing through each of the banks by means of appropriate connectors. The control module of each of the remote stations is equipped with a modem set in a response mode and with several line interfaces connected to the links to be verified.

In operation, from a communication menu, the operator can select the link to be verified. A directory containing preprogrammed links allows this option. By using the telephone option, the operator enters commands into the microcomputer so that it makes a call via its modem to the testing unit of the intermediate station. This testing unit which is in stand-by mode answers the call and confirms reception to the microcomputer. Then, the microcomputer sends command signals to the testing unit so that it selects the links chosen by the operator and calls via its other modem 28 and another telephone line the remote station corresponding to the link that has been selected. The control module of the remote station answers the call, selects the link to be verified and confirms everything. The testing unit of the intermediate station then confirms to the computer that everything is ready for a test procedure. The operator can then monitor different operations to identify a problem on the line that has been selected or simply take some measures on the link that has been selected in order to know the quality of this link. The operator can also monitor a frequency scanning on the selected link to obtain a curve indicative of the frequency response of the selected link at each interval of 100 Hz between 300 and 3000 Hz. When the tests are completed, the operator, by means of a communication menu, terminates the different communications established with the equipment. All the functions that have been activated return to their stand-by mode of operation. The system is now ready for verifying another link.

As previously noted, the operator can select and test a communication link by means of a communication menu produced by a software program stored in the microcomputer. This software program has been written to perform this communication menu.

An explicit listing of this actual program follows.

```c
#include <stdio.h>
#include <stdlib.h>
#include <ctype.h>
#include <dos.h>
#include <graph.h>
void fblank(int,int,int);

union REGS regs;
unsigned char *map = (char*) 0xB0000000;
int page = 0;
char stak[36000];
union {
   struct {
      unsigned fore:3;
      unsigned inte:1;
      unsigned back:3;
      unsigned blink:1;
      } b;
   unsigned i;
} attr;

void fblank (int x,int y,int len)
{
    int ctr;
    att_reverse();
    c_move (x,y);
    for (ctr=0;ctr<=len-1;ctr++)
    {
        c_move (x,y+ctr);
        put_car (' ');

}
    reset_att();
} unsigned mode = 2;
unsigned colon = 1;
unsigned ligne = 1;
int fore = 7;
int back = 0;
int index = 0;
int index1 = 1;
int attc = 7;
int curseur = 1;

char buf[80];

set_mode(mod)
char mod[2];
{
   switch( mod[0] )
      {
```

```c
        case 'H':
        case 'h':
                map = (char*) 0xB0000000;
                break;
        case 'C':
        case 'c':
                map = (char*) 0xB8000000;
                break;
        case 'E':
        case 'e':
                map = (char*) 0xB8000000;
                break;
    }
    erase();
    reset_att();
} c_move(line,col)
int line,col;
{
    regs.h.ah = 2;
    regs.h.dh = line-1;
    regs.h.dl = col-1;
    int86( 0x10 , ®s , ®s );

ligne = line;
    colon = col;
    index = (colon-1)*2 + (ligne-1)*160;
    index1= index + 1;

} clr_c()
{
    union REGS r;
    r.h.ah =1;
    r.h.ch = -1;
    r.h.cl =-1;
    int86(0x10,&r,&r);

} set_c()
{
    union REGS r;
    r.h.ah=1;
    r.h.ch=12;
    r.h.cl=13;
    int86(0x10,&r,&r);
}
```

```c
 put_car(c)
int c;
{
  map[ index ] = c;
  map[ index1 ] = attr.i;
  attc = attr.i;
} lit_car()
{
  return( map[ index ] );
} put_cars(lign,col,car,n)
int lign,col,car,n;
{
  int l,c,j;

for(l=lign,c=col,j=0 ; j<n ; j++,c++)
    {
    c_move(l,c);
    put_car(car);
    }
}
put_cart(c)
int c;
{
  put_car(c);
  c_move(ligne,colon+1);
} erase()
{
  int c,i;
  for(i=0;i<4096;i=i+2)
    {
    map[i] = ' ';
    map[i+1] = attr.i;
    }
} reset_att()
{
  set_fore(7);
  set_back(0);
  attr.b.blink =0;
 } att_bold()
{
  attr.b.inte = 1;
}
```

```
att_soul()
{
  attr.b.fore = 1;
  attr.b.back = 0;
} att_blink()
{
  attr.b.blink = 1;
} att_reverse()
{
  set_fore(0);
  set_back(7);

} set_fore(i)
int i;
{
    if (i>7)
    {
        attr.b.inte = 1;
        i -=8;
    }
    else
        attr.b.inte=0;
     attr.b.fore = i;

}
set_back(i)
int i;
{ attr.b.back = i;

}
c_print(line,col,str)
int line,col;
char str[];
{
  int i,co;

index = (col-1)*2 + (line-1)*160;
  for(i=0,co=col; str[i]!='\0' ; i++,co++)
    {
    map[ index ] = str[i];
    map[ index+1]= attr.i;
    index = index +2;
    }
}
```

```c
    c_box(y1,x1,y2,x2,type)
int y1,x1,y2,x2,type;
{
  int x,y,line,col,index;
  int nx,ny,nx1,ny1;

nx = x2-x1;
  ny = y2-y1;
  nx1 = nx-1;
  ny1 = ny-1;

if( type == 1) goto BOX2;

for( index = (x1)*2 + (y1-1)*160, x=0; x<nx1 ; x++,index = index+2)
    {
      map[index] = 0xCD;
      map[index+1] = attr.i;
    }
  for( index = (x1)*2 + (y2-1)*160, x=0; x<nx1 ; x++,index = index+2)
    {
      map[index] = 0xCD;
      map[index+1] = attr.i;
    } for(y=y1+1 ; y<y2 ; y++)
    {
      index = (x1-1)*2 + (y-1)*160;
      map[index] = 0xba ; index++;
      map[index] = attr.i; index++;
      for(x=x1+1 ; x<x2 ; x++)
        {
          map[index] = ' ';  index++;
          map[index] = 7;  index++;
        }
      map[index] = 0xba; index++;
      map[index] = attr.i;
    } index = (x1-1)*2 + (y1-1)*160;
  map[index] = 0xfe;
  map[index+1] = attr.i;

index = (x2-1)*2 + (y1-1)*160;
  map[index] = 0xfe;
  map[index+1] = attr.i;

index = (x1-1)*2 + (y2-1)*160;
  map[index] = 0xfe;
  map[index+1] = attr.i;

index = (x2-1)*2 + (y2-1)*160;
  map[index] = 0xfe;
  map[index+1] = attr.i;
```

```
            return(0);

BOX2: ;

for(y=y1 ; y<=y2 ; y++)
      {
      index = (x1-1)*2 + (y-1)*160;
      for(x=x1 ; x<=x2 ; x++)
         {
         map[index] = ' ';   index++;
         map[index] = attr.i;  index++;
         }
      }

} int point,nfen=0;
int poin[40];

f_box()
{
    while (nfen)
         recu_box();
} save_box(y1,x1,y2,x2)
int y1,x1,y2,x2;
{
  int i,j,index,nx;
  stak[point] = x1;
  stak[point+1] = y1;
  stak[point+2] = x2;
  stak[point+3] = y2;
  poin[nfen] = point;
  nfen++;

point = point+4;
  nx = (x2-x1+1)*2;
  for(i=y1 ; i<=y2 ; i++)
     {
     index = (x1-1)*2 + (i-1)*160;
     memcpy(&stak[point],&map[index],nx);
     point = point+nx;
     }
} recu_box()
{
  int i,j,index,nx;

int x1,y1,x2,y2;

nfen--;
```

```c
    if (nfen < 0 )
{
    printf ("\007");
    erase();
    c_move(1,1);
    printf ("Erreur de recu_box code=%d",nfen);
    exit(nfen);
}
  point = poin[nfen];
  x1 = stak[point];
  y1 = stak[point+1];
  x2 = stak[point+2];
  y2 = stak[point+3];
  point = point+4;
  nx = (x2-x1+1)*2;
  for(i=y1 ; i<=y2 ; i++)
     {
     index = (x1-1)*2 + (i-1)*160;
     memcpy(&map[index],&stak[point],nx);
     point = point+nx;
     }
  point = poin[nfen];
} scroll (int x1,int y1,int x2,int y2, int nb,int sen)
{
    union REGS r;
    r.h.ah = ( 5 + sen);
    r.h.al = nb;
    r.h.bh = attr.i;
    r.h.ch = x1;
    r.h.cl = y1;
    r.h.dh = x2;
    r.h.dl = y2;
    int86(0x10,&r,&r);
} vline(int x1,int x2,int col, int t)
{
    int a,b;
  int c1,c2,c3,c4,c5,c6;
  if (t == 1)
  {
    c1 = 196; c2=179; c3=218; c4=191; c5=192; c6=217;
  }
  else
  {
    c1 = 205; c2=186; c3=201; c4=187; c5=200; c6=188;
  } for (a=(x1-1)*160;a<=(x2-1)*160;a+=160)
  {
     map[a+(col-1)*2] = c2;
```

```
    map[a+1+(col-1)*2] = attr.i;
  }
} hline(int x1,int x2,int col, int t)
{
   int a,b;
  int c1,c2,c3,c4,c5,c6;
  if (t == 1)
   {
     c1 = 196; c2=179; c3=218; c4=191; c5=192; c6=217;
   }
   else
   {
     c1 = 205; c2=186; c3=201; c4=187; c5=200; c6=188;
   } for (a=(x1-1)*2;a<=(x2-1)*2;a+=2)
     map[a+(col-1)*160] = c1;
     map[a+1+(col-1)*160] = attr.i;
} window (y1,x1,y2,x2,nom,db)

int y1,x1,y2,x2,db;
char nom[];

{ int x,y,line,col,index;
  int nx,ny,nx1,ny1;
  int c1,c2,c3,c4,c5,c6;
  if (db == 1)
   {
     c1 = 196; c2=179; c3=218; c4=191; c5=192; c6=217;

}
   else
   {
     c1 = 205; c2=186; c3=201; c4=187; c5=200; c6=188;
   } nx = x2-x1;
  ny = y2-y1;
  nx1 = nx-1;
  ny1 = ny-1;
  if (ny1 == 999)
     {
     } for( index = (x1)*2 + (y1-1)*160, x=0; x<nx1 ; x++,index = index+2)
```

```c
    {
    map[index] = c1;
    map[index+1] = attr.i;
    }
  for( index = (x1)*2 + (y2-1)*160, x=0; x<nx1 ; x++,index = index+2)
    {
    map[index] = c1;
    map[index+1] = attr.i;
    } for(y=y1+1 ; y<y2 ; y++)
    {
    index = (x1-1)*2 + (y-1)*160;
    map[index] = c2  ;
    index++;
    map[index] = attr.i;
    index++;
    for(x=x1+1 ; x<x2 ; x++)
      {
      map[index] = ' ';
      index++;
      map[index] = attr.i;
      index++;
      }
    map[index] = c2;
    index++;
    map[index] = attr.i;
    } index = (x1-1)*2 + (y1-1)*160;
  map[index] = c3;
  map[index+1] = attr.i;

index = (x2-1)*2 + (y1-1)*160;
  map[index] = c4;
  map[index+1] = attr.i;

index = (x1-1)*2 + (y2-1)*160;
  map[index] = c5;
  map[index+1] = attr.i;

index = (x2-1)*2 + (y2-1)*160;
  map[index] = c6;
  map[index+1] = attr.i;
    att_bold();
  c_print (y1,(x1+((x2-x1)/2))-(strlen(nom)/2),nom);
    reset_att();
} title(int y, int x ,char *message,char *message2,int pos,int pos2,int pos3,
      int pos4,int deca)
{
```

```
    int car;
    int ctr;
    int px,py;
    px = ((x+pos-1)-1)*2;
    py = (y-1)*160;
    c_print(y,x,message);
    c_print(y+1,x+deca,message2);
    for (ctr=pos;ctr<=pos2;ctr++)
    {
        px=((x+ctr-1)-1)*2;
        py=(y-1)*160;
        map[px+py+1] = 0xF;
    }
    if (pos3!=0)
        for (ctr=pos3;ctr<=pos4;ctr++)
        {
            px=((x+ctr-1)-1)*2;
            py=(y)*160;
            map[px+py+1]=0xF;
        }
    c_move(y-1,x+strlen(message));
    if ( (car = lit_car())==196)      /* - */
      {
        c_move(y-1,x+strlen(message));
        put_car(194);
      }
    c_move(y,x+strlen(message));
    put_car(179);
    c_move(y+1,x+strlen(message));
    put_car(179);
    if ( (x+strlen(message))!=80)
      {
        c_move(y+2,x+strlen(message));
        put_car(193);
      }
} clean_edt(y1,x1,y2,x2)
{
    int x,y;
    for (y=y1-1;y<=y2-1;y++)
        for (x=x1-1;x<=x2-1;x++)
        {
            map[y*160+x*2] = ' ';
            map[y*160+x*2+1] = attr.i;
        }

} rev_line (int line,int deb,int fin,int c1,int c2)
{
    int att;
```

```c
    if (c1==15)
        c1=7;

set_fore(c2);
    set_back(c1);
    for (att = (line-1)*160+(deb-1)*2;att<=(line-1)*160+(fin-1)*2;att+=2)
    {
        map[att+1] = attr.i;
    }
} int init_gcard()
{
    union REGS reg;
    int colorcard;
    reg.h.ah = 15;
    int86(0x10,®,®);
    colorcard = (reg.h.al != 7);
    map = (char far *) (colorcard ? 0xB8000000L : 0xB0000000L);
    return (colorcard);
} void _cursoroff()
{
    union REGS regs;
    regs.h.ah=1;
    regs.x.cx = 0x2000;
    int86(0x10,®s,®s);

regs.h.ch = -1;
    regs.h.cl = -1;
    int86(0x10,®s,®s);
} void _cursoron()
{
    union REGS regs;
    regs.h.ah=1;
    regs.h.ch = 7;
    regs.h.cl = 8;

int86(0x10,®s,®s);
} info(char *titre,char *data,int co1,int co2)
{
    unsigned int color = attr.i;
    save_box(20,10,25,70);
    set_fore(co1);
    set_back(co2);
    window(20,10,25,70,titre,1);
    c_print (22,12,data);
    attr.i = color;
```

```
                    } info2(char *titre,char *data,int co1,int co2)
{
    unsigned int color = attr.i;
    save_box(8,10,13,70);
    set_fore(co1);
    set_back(co2);
    window(8,10,13,70,titre,1);
    c_print (10,12,data);
    attr.i = color;
} menu_top(int y,int x ,char *message,int pos)
{
    int car;
    int ctr;
    int px,py;
    px = ((x+pos-1)-1)*2;
    py = (y-1)*160;
    c_print(y,x,message);
    px = ((x+pos-1)-1)*2;
    py = (y - 1) * 160;
    map[px+py+1] = 0xF;
} int menu_bar (int y1,int x1,int y2,int x2,char* title,int mode,char * op [],int nb
c1,int c2,int c3,int cl)
{
    unsigned color = attr.i;
    int compteur;
    int keb;
    int pos = 0;
    int search;
    int ln1;
    int ln2;

set_fore(c1);
    set_back(c2);
    window (y1,x1,y2,x2,title,mode);
    set_fore(c1);
    set_back(c2);
    for (compteur=0;compteur<=nb;compteur++)
    {
        ln1 = strlen(op[compteur]);
        ln2 = ((x2-x1)/2) + x1;
        c_print (y1+1+compteur,x1+2,op[compteur]);
    } set_fore(c2);
    set_back(c1);
    pos = cl;
    ln1 = strlen(op[0]);
    c_print (y1+1+pos,x1+2,op[pos]);
```

```
    while ( (keb=clav()) != 4)
        {
       switch(keb)
         {
       case  280 :
           if (pos < nb)
             {
              set_fore(c1);
              set_back(c2);
              ln1 = strlen(op[pos]);
              c_print (y1+1+pos,x1+2,op[pos]);
              pos++;
              set_fore(c2);
              set_back(c1);
              ln1 = strlen(op[pos]);
              c_print (y1+1+pos,x1+2,op[pos]);
              }
           break;
       case 272 :
           if (pos > 0)
             {
              set_fore(c1);
              set_back(c2);
              ln1 = strlen(op[pos]);
              c_print (y1+1+pos,x1+2,op[pos]);
              pos--;
              set_fore(c2);
              set_back(c1);
              ln1 = strlen(op[pos]);
              c_print (y1+1+pos,x1+2,op[pos]);
              }
           break;
       case 13 :
           attr.i = color;
           return (pos);break;
       case 27 :
           attr.i= color;
           return(99);break;
         }
        }
} vline2(int x1,int x2,int col,int ch)
{
int a,b;

for  (a=(x1-1)*160;a<=(x2-1)*160;a+=160)
     {
    map[a+(col-1)*2] = ch;
    map[a+1+(col-1)*2] = attr.i;
     }
} hline2(int x1,int x2,int col, int ch)
```

```
                                                    {
int a,b;

for (a=(x1-1)*2;a<=(x2-1)*2;a+=2)
    {
    map[a+(col-1)*160] = ch;
    map[a+1+(col-1)*160] = attr.i;
    }
}
```

```
#define LMODEL 1
define WINDOWS 1 define BTR_ERR     20
define BTR_INT     0x7B
#define BTR2_INT    0x2F
#define BTR_VECTOR  BTR_INT * 4
#define BTR_OFFSET  0x33
#define VARIABLE_ID 0x6176
define _2FCODE     0xAB00 static unsigned ProcId = 0;
static char MULTI = 0;
static char VSet = 0;

BTRV (OP, POS_BLK, DATA_BUF, DATA_LEN, KEY_BUF, KEY_NUM)
   int  OP;
   char POS_BLK[];
   char DATA_BUF[];
   int  *DATA_LEN;
   char KEY_BUF[];
   int  KEY_NUM;

{
struct REGVAL { int AX, BX, CX, DX, SI, DI, CY; } REGS;

struct SEGREG { short ES, CS, SS, DS; } SREGS;

struct BTRIEVE_PARMS
  {
    char *BUF_OFFSET;
#ifndef LMODEL
    int   BUF_SEG;
#endif
    int   BUF_LEN;
    char *CUR_OFFSET;
#ifndef LMODEL
    int   CUR_SEG;
#endif
    char *FCB_OFFSET;
#ifndef LMODEL
    int   FCB_SEG;
#endif
    int   FUNCTION;
    char *KEY_OFFSET;
#ifndef LMODEL
    int   KEY_SEG;
#endif
    char  KEY_LENGTH;
    char  KEY_NUMBER;
    int   *STAT_OFFSET;
#ifndef LMODEL
    int   STAT_SEG;
#endif
```

```c
      int    XFACE_ID;
  } XDATA;

int STAT = 0;

if (!VSet)
  {
   VSet = 1;
   REGS.AX = 0x3000;
#ifdef WINDOWS
   int86 (0x21, ®S, ®S);
#else
   int86x (0x21, ®S, ®S, &SREGS);
#endif
   if ((REGS.AX & 0x00FF) >= 3)
     {
      REGS.AX = _2FCODE;
#ifdef WINDOWS
      int86 (BTR2_INT, ®S, ®S);
#else
      int86x (BTR2_INT, ®S, ®S, &SREGS);
#endif
      MULTI = ((REGS.AX & 0xFF) == 'M');
     }
  } if (!MULTI)
  {
   REGS.AX = 0x3500 + BTR_INT;
#ifdef WINDOWS
   int86 (0x21, ®S, ®S);
#else
   int86x (0x21, ®S, ®S, &SREGS);
#endif
   if (REGS.BX != BTR_OFFSET)
       return (BTR_ERR);
  } segread (&SREGS);
ifndef LMODEL
XDATA.BUF_SEG = XDATA.CUR_SEG = XDATA.FCB_SEG =
   XDATA.KEY_SEG = XDATA.STAT_SEG = SREGS.SS;
endif XDATA.FUNCTION    = OP;
XDATA.STAT_OFFSET = &STAT;
XDATA.FCB_OFFSET  = POS_BLK;
XDATA.CUR_OFFSET  = POS_BLK + 38;
XDATA.BUF_OFFSET  = DATA_BUF;
XDATA.BUF_LEN     = *DATA_LEN;
XDATA.KEY_OFFSET  = KEY_BUF;
```

```
                         = 255;     XDATA.KEY_LENGTH
XDATA.KEY_NUMBER = KEY_NUM;
XDATA.XFACE_ID   = VARIABLE_ID;

REGS.DX = (int) &XDATA;
SREGS.DS = SREGS.SS;
if (!MULTI)
#ifdef WINDOWS
   int86 (BTR_INT, ®S, ®S);
#else
   int86x (BTR_INT, ®S, ®S, &SREGS);
#endif
else
  {
    while (1)
      {
        REGS.AX = 1;
        if ((REGS.BX = ProcId) != 0)
           REGS.AX = 2;
        REGS.AX += _2FCODE;
#ifdef WINDOWS
        int86 (BTR2_INT, ®S, ®S);
#else
        int86x (BTR2_INT, ®S, ®S, &SREGS);
#endif
        if ((REGS.AX & 0x00FF) == 0) break;
#ifndef WINDOWS
        REGS.AX = 0x0200;
        int86x (0x7F, ®S, ®S, &SREGS);
#endif
      }
    if (ProcId == 0) ProcId = REGS.BX;
  }

*DATA_LEN = XDATA.BUF_LEN;
return (STAT);
}
```

```c
/*** MAITRE.C ***/
#include "samdi.h"
extern int co1, co2, co3, co4, co5, co6, co7, co8;
extern int ONLINE;
int Mgen0    = 0;
int Mgen8    = 0;
int Mloop0   = 0;
int Mloop16  = 0;
int Mponttx  = 0;
int Mpontrx  = 0;
int Madap    = 0;
char Mrep[2]; /
int Metat    = 0;
int Mlect    = 0;

menu_maitre()
{
char *option[8];
int choix;

option[0] = "Générateur  0 dbm";
option[1] = "Générateur -8 dbm";
option[2] = "Loopback   0 db";
option[3] = "Loopback 16 db";
option[4] = "Mesure en pont - Tx";
option[5] = "Mesure en pont - Rx";
option[6] = "Mesure terminée";
option[7] = "Reset";

save_box(2,19,11,42);

set_fore(co1);set_back(co2);
menu_top(1,19,"Local",1);
reset_att();
choix = menu_bar(2,19,11,42,"",1,option,7,co3,co4,co5,0);
recu_box();

if(!ONLINE)
    statut("Aucun lien actif!");
else
    {
    switch(choix)
    {
    case 0:
        gen_maitre(0);
        break;
    case 1:
        gen_maitre(-8);
        break;
    case 2:
        loopback_maitre(0);
        break;
    case 3:
        loopback_maitre(16);
```

```
                break;
        case 4:
            pont_maitre_tx();
            break;
        case 5:
            pont_maitre_rx();
            break;
        case 6:
            adapte_maitre();
            break;
        case 7:
            reset_maitre();
            break;
        case 99:
            break;
        }
    } set_fore(co6);set_back(co5);
menu_top(1,19,"Local",1);
reset_att();
} gen_maitre(int niveau)
{
if(niveau == 0)
    {
    if(!Mgen0)
    {
    Metat = command("[S0",Mrep);
    if(command_stat(Metat,Mrep,0) )
        {
        Metat = command("[M8C",Mrep);
        if(command_stat(Metat,Mrep,0) )
          {
          Mreset_flags();
          Mgen0 = 1;
          Mlect = 1;
          dessine_maitre();
          dessine_gen_maitre("0 dbm ");
          clean_edt(14,11,14,31);
          hline(22,31,14,1);
          window(19,15,21,27," Signal ",2);
          vline(14,18,21,2);
          c_print(14,21,"X");
          statut("Générateur 0 dbm activé / Local");
          }
        }
    }
    }
else
    {
    if(!Mgen8)
    {
```

```
    Metat = command("[S0",Mrep);
    if(command_stat(Metat,Mrep,0) )
        {
        Metat = command("[MCC",Mrep);
        if(command_stat(Metat,Mrep,0) )
          {
          Mreset_flags();
          Mgen8 = 1;
          Mlect = 1;
          dessine_maitre();
          dessine_gen_maitre("-8 dbm");
          clean_edt(14,11,14,31);
          hline(22,31,14,1);
          window(19,15,21,27," Signal ",2);
          vline(14,18,21,2);
          c_print(14,21,"X");
          statut("Générateur -8 dbm activé / Local");
          }
        }
    }
   }
} dessine_gen_maitre(char *texte)
{
clean_edt(8,11,12,31);
hline(24,31,10,1);
window(9,18,11,24,"",1);
att_bold();
c_print(10,21," ");
reset_att();
c_print(8,18,"1004 Hz");
c_print(12,19,texte);
c_print(10,18,"┤");
c_print(10,24,"├");
c_print(10,31,"^P");
} loopback_maitre(int gain)
{
if(gain == 0)
    {
    if(!Mloop0)
     {
    Metat = command("[S0",Mrep);
    if(command_stat(Metat,Mrep,0) )
        {
        Metat = command("[M0C",Mrep);
        if(command_stat(Metat,Mrep,0) )
          {
          Mreset_flags();
          Mloop0 = 1;
          dessine_maitre();
          dessine_loop_maitre("G = 0");
```

```
            statut("Loopback 0 db activé / Local");
          }
        }
      }
    }
  else
    {
    if(!Mloop16)
      {
    Metat = command("[S0",Mrep);
    if(command_stat(Metat,Mrep,0) )
        {
        Metat = command("[M4C",Mrep);
        if(command_stat(Metat,Mrep,0) )
          {
          Mreset_flags();
          Mloop16 = 1;
          dessine_maitre();
          dessine_loop_maitre("G = 16");
          statut("Loopback 16 db activé / Local");
          }
        }
      }
    }
} dessine_loop_maitre(char *texte)
{
clean_edt(10,11,14,31);
window(11,17,13,25,"",1);
att_bold();
c_print(12,19,texte);
reset_att();
c_print(10,21,"⌈");
c_print(11,21,"⊥");
c_print(10,31,"^P");
hline(22,30,10,1);
c_print(13,21,"^^");
c_print(14,21,"∟");
hline(22,31,14,1);
} pont_maitre_tx()
{
float signal = 0.0;
char text[10];

Metat = command("[S0",Mrep);
    if(command_stat(Metat,Mrep,0) )
      {
      Metat = command("[M1B",Mrep);
```

```
    if(command_stat(Metat,Mrep,0) )
        {
        Mreset_flags();
        Mponttx = 1;
        Mlect = 1;
        dessine_maitre();
        window(3,15,5,27," Signal ",2);
        vline(6,10,21,2);
        c_print(5,21,"T");
        c_print(10,21,"X");
        statut("Mesure en pont (Tx) activée / Local");
        }
    }
} pont_maitre_rx()
{
float signal = 0.0;
char text[10];

Metat = command(" [S0",Mrep);
    if(command_stat(Metat,Mrep,0) )
    {
    Metat = command(" [M17",Mrep);
    if(command_stat(Metat,Mrep,0) )
        {
        Mreset_flags();
        Mpontrx = 1;
        Mlect = 1;
        dessine_maitre();
        window(19,15,21,27," Signal ",2);
        vline(14,18,21,2);
        c_print(14,21,"X");
        statut("Mesure en pont (Rx) activée / Local");
        }
    }
} adapte_maitre()
{
float signal = 0.0;
char text[10];

Metat = command(" [S0",Mrep);
    if(command_stat(Metat,Mrep,0) )
    {
    Metat = command(" [M0E",Mrep);
    if(command_stat(Metat,Mrep,0) )
        {
        Mreset_flags();
        Madap = 1;
        Mlect = 1;
        dessine_maitre();
        clean_edt(14,11,14,31);
```

```
        hline(22,31,14,1);
        window(19,15,21,27," Signal ",2);
        vline(14,18,21,2);
        c_print(14,21,"X");
        statut("Mesure terminée activée / Local");
        }
    }
} int reset_maitre()
{
Metat = command("[S0",Mrep);
if(command_stat(Metat,Mrep,0) )
     {
     Metat = command("[MOF",Mrep);
     if(command_stat(Metat,Mrep,0) )
     {
     Mreset_flags();
     dessine_maitre();
     statut("Reset / Local");
     }
     }
if(Metat != 0)
     statut("Reset / Local : pas de réponse");
return(Metat);
}

Mreset_flags()
{
Mgen0    = 0;
Mgen8    = 0;
Mloop0   = 0;
Mloop16  = 0;
Mponttx  = 0;
Mpontrx  = 0;
Madap    = 0;
Mlect    = 0;
}
```

```c
/*** LIEN.C ***/
#include "samdi.h"

#define duplicate   1
#define modifiable  2
#define binary      4
#define null        8
define segmented   16 extern int co1, co2, co3, co4, co5, co6, co7, co8;
struct btr_file specs;
struct Record enr;

int STA = 0;
int len = sizeof(enr);
char pos[128], key[21];

creer_fichier()
{
specs.long_rec = len;
specs.page_size = 512;
specs.nb_index = 1;
specs.va_length = 0;
specs.key1_pos = 1;
specs.key1_len = 21;
specs.key1_flag = modifiable;
STA = BTRV (CREATE,pos,&specs,&len,"liens.dbf",0);
if(STA)
    erreur(0,0,STA);
} ecrit_lien(char * data[],char *oldkey,int mode)
{
STA = BTRV(OPEN,pos,&enr,&len,"liens.dbf",key,0);
if(STA == 12)
    {
    creer_fichier();
    STA = BTRV(OPEN,pos,&enr,&len,"liens.dbf",key,0);
    }
if(STA)
    erreur(1,0,STA);
switch(mode)
    {
    case nouv:
    sprintf(enr.nom,"%s",data[0]);
    sprintf(enr.desc,"%s",data[1]);
    sprintf(key,"%s",data[0]);
    sprintf(enr.tel_master,"%s",data[2]);
    sprintf(enr.banque,"%s",data[3]);
    sprintf(enr.relais,"%s",data[4]);
    sprintf(enr.tel_slave,"%s",data[5]);
    sprintf(enr.banque2,"%s",data[6]);
    sprintf(enr.relais2,"%s",data[7]);
    STA = BTRV(INSERT,pos,&enr,&len,key,0);
```

```
        if(STA)
            erreur(2,0,STA);
        break;
     case edit:
        STA = BTRV(EQUAL,pos,&enr,&len,oldkey,0);
        if(!STA)
            {
            sprintf(key,"%s",oldkey);
            sprintf(enr.nom,"%s",data[0]);
            sprintf(enr.desc,"%s",data[1]);
            sprintf(enr.tel_master,"%s",data[2]);
            sprintf(enr.banque,"%s",data[3]);
            sprintf(enr.relais,"%s",data[4]);
            sprintf(enr.tel_slave,"%s",data[5]);
            sprintf(enr.banque2,"%s",data[6]);
            sprintf(enr.relais2,"%s",data[7]);
            STA = BTRV(UPDATE,pos,&enr,&len,key,0);
            if(STA)
              erreur(5,0,STA);
            }
        break;
     }
STA = BTRV(CLOSE,pos,&enr,&len,key,0);
if(STA)
    erreur(3,0,STA);
} int efface_lien(char *clef)
{
STA = BTRV(OPEN,pos,&enr,&len,"liens.dbf",key,0);
STA = BTRV(EQUAL,pos,&enr,&len,clef,0);
if(!STA)
    {
    STA = BTRV(DELETE,pos,&enr,&len,clef,0);
    if(STA)
    erreur(6,0,STA);
    }

STA = BTRV(CLOSE,pos,&enr,&len,key,0);
if(STA)
    erreur(3,0,STA);
} int verifie_cle(char *clef)
{
STA = BTRV(OPEN,pos,&enr,&len,"liens.dbf",key,0);
STA = BTRV(EQUAL_KEY,pos,&enr,&len,clef,0);
if(!STA)
    {
    STA = BTRV(CLOSE,pos,&enr,&len,key,0);
    return(1);
    }
else
    {
```

```
      STA = BTRV(CLOSE,pos,&enr,&len,key,0);
      return(0);
      }
} erreur(int code1, int code2,int errcode)
{
char mess[78];
char mess2[78];
char mess3[12];

char *text1[7] =
      {
      "Erreur de création du fichier LIENS.DBF",
      "Erreur d'ouverture du fichier LIENS.DBF",
      "Erreur d'insertion au fichier LIENS.DBF",
      "Erreur de fermeture du fichier LIENS.DBF",
      "Erreur de positionnement, LIENS.DBF",
      "Erreur de modification",
      "Erreur d'effacement au fichier LIENS.DBF"
      };
char *text2[1] =
      {
      "Appuyer sur une touche..."
      };

sprintf(mess,"                                        ");
sprintf(mess2,"                                        ");
sprintf(mess3,"                ");
sprintf(mess,"%s",text1[code1]);
sprintf(mess2,"%s",text2[code2]);
sprintf(mess3," CODE : %d ",errcode);
save_box(9,18,15,62);
set_fore(co5);
set_back(co3);
window(9,18,15,62,"",2);
set_fore(co7);
set_back(co3);
c_print(11,(80 - strlen(mess))/2,mess);
c_print(12,(80 - strlen(mess2))/2,mess2);
c_print(13,(80 - strlen(mess3))/2,mess3);
clav();
set_fore(co1);
set_back(co2);
recu_box();
}
```

```
                                      /*** ESCLAVE.C ***/
                  #include "samdi.h"
                  extern int co1, co2, co3, co4, co5, co6, co7, co8;
                  extern int ONLINE;
                  int Egen0   = 0;

int Egen8   = 0;
int Eloop0  = 0;
int Eloop16 = 0;
int Eponttx = 0;
int Epontrx = 0;
int Eadap   = 0;
char Erep[2];
int Eetat   = 0;
int Elect   = 0;

menu_esclave()
{
char *option[8];
int choix;

option[0] = "Générateur   0 dbm";
option[1] = "Générateur -8 dbm";
option[2] = "Loopback   0 db";
option[3] = "Loopback 16 db";
option[4] = "Mesure en pont - Tx";
option[5] = "Mesure en pont - Rx";
option[6] = "Mesure terminée";
option[7] = "Reset";

save_box(2,26,11,49);

set_fore(co1);set_back(co2);
menu_top(1,26,"Eloigné",1);
reset_att();
choix = menu_bar(2,26,11,49,"",1,option,7,co3,co4,co5,0);
recu_box();

if(!ONLINE)
    statut("Aucun lien actif!");
else
    {
    switch(choix)
    {
    case 0:
        gen_esclave(0);
        break;
    case 1:
        gen_esclave(-8);
        break;
    case 2:
        loopback_esclave(0);
        break;
    case 3:
```

```
            loopback_esclave(16);
            break;
        case 4:
            pont_esclave_tx();
            break;
        case 5:
            pont_esclave_rx();
            break;
        case 6:
            adapte_esclave();
            break;
        case 7:
            reset_esclave();
            break;
        case 99:
            break;
        }
     } set_fore(co6);set_back(co5);
menu_top(1,26,"Eloigné",1);
reset_att();
} gen_esclave(int niveau)
{
if(niveau == 0)
    {
    if(!Egen0)
    {
    Eetat = command("[S1",Erep);
    if(command_stat(Eetat,Erep,1) )
        {
        Eetat = command("[M8C",Erep);
        if(command_stat(Eetat,Erep,1) )
         {
         Ereset_flags();
         Egen0 = 1;
         Elect = 1;
         dessine_esclave();
         dessine_gen_esclave(" 0 dbm");
         clean_edt(10,49,10,69);
         hline(49,59,10,1);
         window(3,53,5,65," Signal ",2);
         vline(6,10,59,2);
         c_print(5,59,"T");
         c_print(10,59,"X");
         statut("Générateur 0 dbm activé / Eloigné");
         }
        }
    }
    }
else
    {
```

```
    if(!Egen8)
    {
    Eetat = command("[S1",Erep);
    if(command_stat(Eetat,Erep,1) )
        {
        Eetat = command("[MCC",Erep);
        if(command_stat(Eetat,Erep,1) )
          {
          Ereset_flags();
          Egen8 = 1;
          Elect = 1;
          dessine_esclave();
          dessine_gen_esclave("-8 dbm");
          clean_edt(10,49,10,69);
          hline(49,59,10,1);
          window(3,53,5,65," Signal ",2);
          vline(6,10,59,2);
          c_print(5,59,"T");
          c_print(10,59,"X");
          statut("Générateur -8 dbm activé / Eloigné");
          }
        }
    }
      }
} dessine_gen_esclave(char *texte)
{
clean_edt(12,49,16,69);
hline(49,56,14,1);
window(13,56,15,62,"",1);
att_bold();
c_print(14,59," ");
reset_att();
c_print(12,56,"1004 Hz");
c_print(16,57,texte);
c_print(14,56,"┤");
c_print(14,62,"├");
c_print(14,49,"^Q");
} loopback_esclave(int gain)
{
if(gain == 0)
    {
    if(!Eloop0)
    {
    Eetat = command("[S1",Erep);
    if(command_stat(Eetat,Erep,1) )
        {
        Eetat = command("[M0C",Erep);
        if(command_stat(Eetat,Erep,1) )
          {
          Ereset_flags();
```

```
            Eloop0 = 1;
            dessine_esclave();
            dessine_loop_esclave("G = 0");
            statut("Loopback 0 db activé / Eloigné");
            }
          }
        }
      }
    else
       {
        if(!Eloop16)
        {
        Eetat = command("[S1",Erep);
        if(command_stat(Eetat,Erep,1) )
             {
             Eetat = command("[M4C",Erep);
             if(command_stat(Eetat,Erep,1) )
               {
               Ereset_flags();
               Eloop16 = 1;
               dessine_esclave();
               dessine_loop_esclave("G = 16");
               statut("Loopback 16 db activé / Eloigné");
               }
             }
         }
       }
} dessine_loop_esclave(char *texte)
{
clean_edt(10,49,14,69);
window(11,55,13,63,"",1);
att_bold();
c_print(12,57,texte);
reset_att();
hline(49,59,10,1);
c_print(10,59,"┐");
c_print(11,59,"^_");
hline(49,59,14,1);
c_print(14,49,"^Q");
c_print(13,59,"┬");
c_print(14,59,"┘");
} pont_esclave_tx()
{
float signal = 0.0;
char text[10];

Eetat = command("[S1",Erep);
     if(command_stat(Eetat,Erep,1) )
     {
     Eetat = command("[M1B",Erep);
```

```
    if(command_stat(Eetat,Erep,1) )
        {
        Ereset_flags();
        Eponttx = 1;
        Elect = 1;
        dessine_esclave();
        window(19,53,21,65," Signal ",2);
        vline(14,18,59,2);
        c_print(14,59,"X");
        statut("Mesure en pont (Tx) activée / Eloigné");
        }
    }
} pont_esclave_rx()
{
float signal = 0.0;
char text[10];

Eetat = command("[S1",Erep);
    if(command_stat(Eetat,Erep,1) )
    {
    Eetat = command("[M17",Erep);
    if(command_stat(Eetat,Erep,1) )
        {
        Ereset_flags();
        Epontrx = 1;
        Elect = 1;
        dessine_esclave();
        window(3,53,5,65," Signal ",2);
        vline(6,10,59,2);
        c_print(5,59,"T");
        c_print(10,59,"X");
        statut("Mesure en pont (Rx) activée / Eloigné");
        }
    }
} adapte_esclave()
{
float signal = 0.0;
char text[10];

Eetat = command("[S1",Erep);
    if(command_stat(Eetat,Erep,1) )
    {
    Eetat = command("[M0E",Erep);
    if(command_stat(Eetat,Erep,1) )
        {
        Ereset_flags();
        Eadap = 1;
        Elect = 1;
        dessine_esclave();
        clean_edt(10,49,10,69);
```

```c
        hline(49,59,10,1);
        window(3,53,5,65," Signal ",2);
        vline(6,10,59,2);
        c_print(5,59,"T");
        c_print(10,59,"X");
        statut("Mesure terminée activée / Eloigné");
        }
    }
} int reset_esclave()
{
Eetat = command("[S1",Erep);
if(command_stat(Eetat,Erep,1) )
    {
    Eetat = command("[M0F",Erep);
    if(command_stat(Eetat,Erep,1) )
    {
    Ereset_flags();
    dessine_esclave();
    statut("Reset / Eloigné");
    }
    }
if(Eetat != 0)
    statut("Reset / Eloigné : pas de réponse");
return(Eetat);
}

Ereset_flags()
{
Egen0   = 0;
Egen8   = 0;
Eloop0  = 0;
Eloop16 = 0;
Eponttx = 0;
Epontrx = 0;
Eadap   = 0;
Elect   = 0;
}
```

```c
/*** COMM.C ***/
#include "samdi.h"
#include "touche.c"

extern int co1, co2, co3, co4, co5, co6, co7, co8;
int port = 1;        /* COM1 */
int vitesse = 2400;/* 2400 */
int ONLINE = 0;

struct Record rec;
char *data[8] =
    {
    "                              ",
    "                              ",
    "                              ",
    "                              ",
    "     ",
    "     ",
    "                              ",
    "     ",
    "     "
    };

menu_comm()
{
char *option[7];
int choix, STAT;

option[0] = "Téléphoner";
option[1] = "Raccrocher";
option[2] = "Configuration";
option[3] = "Nouveau lien";
option[4] = "Editer lien";
option[5] = "Effacer lien";
option[6] = "Quitter";

save_box(2,4,10,20);

set_fore(co1);set_back(co2);
menu_top(1,4,"Communication",1);
reset_att();

choix = menu_bar(2,4,10,20,"",1,option,6,co3,co4,co5,0);
switch(choix)
    {
    case 0:
    recu_box();
    if(!ONLINE)
        {
        if(etablir_lien() == 1)
          statut("Le système est prêt pour les tests");
        }
    else   statut("Un lien est déjà actif");
    c_move(1,1); clr_c();
    break;
```

```
case 1:
recu_box();
if(ONLINE)
    {
    reset_maitre();
    if(reset_esclave() != -1)
     hang_up();
    }
else   statut("Aucun lien actif, opération annulée!");
c_move(1,1);  clr_c();
break;
 case 2:
if(!ONLINE)
    menu_config();
recu_box();  c_move(1,1);  clr_c();
break;
 case 3:
creer_lien();
recu_box();  c_move(1,1);  clr_c();
break;
 case 4:
editer_lien();
recu_box();  c_move(1,1);  clr_c();
break;
 case 5:
effacer_lien();
recu_box();  c_move(1,1);  clr_c();
break;
 case 6:
recu_box();
if(ONLINE)
    {
    reset_maitre();
    if(reset_esclave() != -1)
     hang_up();
    }
c_move(1,1);  set_c();
erase();
STAT = BTRV(STOP);
if(STAT)
    printf("Erreur sortie BTRIEVE code = %d ",STAT);
exit(0);
break;
 case 99:
recu_box();  c_move(1,1);  clr_c();
break;
 } set_fore(co6) set_back(co5);
menu_top(1,4,"Communication",1);
reset_att();
}
```

```
menu_config()
{
char *option[4];
char texte[50];
int choix;

option[0] = "COM1";
option[1] = "COM2";
option[2] = "COM3";
option[3] = "COM4";

save_box(5,22,10,36);
    choix = menu_bar(5,22,10,36," Port série ",3,option,3,co3,co4,co5,port-1);
    switch(choix)
    {
    case 0:       /* com1 */
        port = 1;
        break;
    case 1:       /* com2 */
        port = 2;
        break;
    case 2:       /* com3 */
        port = 3;
        break;
    case 3:       /* com4 */
        port = 4;
        break;
    case 99:      /* esc */
        break;
    }
init_com1(port,vitesse,'N',1,8);
sprintf(texte,"Configuration: port --> %s, vitesse --> %d",option[port-1],vitess
statut(texte);
recu_box();
} creer_lien()
{
int cle, rep;
int i = 0;

clean_data();
save_box(1,1,25,80);
set_c();

ecran_edit(" Nouveau lien ",nouv);
reset_att();

cle = lecture(0,data[0]);
do
    {
```

```
 switch(cle)
 {
case ESC:
     recu_box();
     return(0);
     break;
case ENTER:
case F_B:
     if(i <= 6)
       i++;
     else
       i = 0;
     cle = lecture(i,data[i]);
     break;
case F_H:
     if(i >= 1)
       i--;
     else
       i = 7;
     cle = lecture(i,data[i]);
     break;
case K_F1:
     rep = confirm("Acceptez-vous ces données (O/N) ?");
     switch(rep)
       {
       case 'o':
       case 'O':

if( verifie_champs() )
           ecrit_lien(data,"",nouv);
         else      mess_erreur("Tous    les    champs    (sauf    description)","
obligatoires!");
         break;
       case 'n':
       case 'N':

break;
       }
     clean_data();
     att_reverse();
     affiche_data();
     reset_att();
     i = 0;
     cle = lecture(i,data[i]);
     break;
case K_F10:
     rep = confirm("Entrée de données terminée (O/N) ?");
     if(rep == 'o'|| rep == 'O')
       {
       recu_box();
       return(0);
       }
     else
       cle = lecture(i,data[i]);
```

```
            break;
    default:
        break;
    }
    }
while(1);
} editer_lien()
{
int cle, rep, autre, i;
char oldkey[] = "                          ";

clean_data();
save_box(1,1,25,80);

while(1)
    {
    autre = 0;
    i = 0;
    window(1,1,25,80," Edition de lien ",1);
    set_fore(co8); set_back(co2);
    c_print(18,14,"Choisissez le lien voulu et");
    c_print(19,14,"tapez <ENTER> pour l'édition");
    set_fore(co6);  set_back(co5);
    c_print(25,1,"
            ");
    c_print(25,2,"<ESC> Quitter - <^Y> Suiv. - <^X> Préc. - <PgDn> Page suiv. - <P
Page préc.");
    reset_att();

if(choisir_lien() == -1)
    {
    recu_box();
    return(0);
    } ecran_edit(" Edition de lien ",edit);
    reset_att();

att_reverse();
    affiche_data();
    reset_att();

sprintf(oldkey,data[0]);

cle = llitf_str(6,40,data[0],20);
    do
    {
    switch(cle)
        {
        case ESC:
          recu_box();
```

```
        return(0);
        break;
    case ENTER:
    case F_B:
        if(i <= 6)
            i++;
        else
            i = 0;
        if(i == 0)
            cle = llitf_str(6,40,data[0],20);
        else
            cle = lecture(i,data[i]);
        break;
    case F_H:
        if(i >= 1)
            i--;
        else
            i = 7;
        if(i == 0)
            cle = llitf_str(6,40,data[0],20);
        else
            cle = lecture(i,data[i]);
        break;
    case K_F1:
        rep = confirm("Acceptez-vous ces données (O/N) ?");
        if(rep == 'o'|| rep == 'O')
            {
            if( strcmp(oldkey,data[0]) != 0 )
              {
              if( verifie_cle(data[0]) )
                 {
                 mess_erreur("Ce nom existe déjà dans le fichier","Utilisez un a
nom !");
                 autre = 0;
                 }
              else
                 {
                 if( verifie_champs() )
                  ecrit_lien(data,oldkey,edit);
                 else    mess_erreur("Tous les champs (sauf description)","
obligatoires!");
                 autre = 1;
                 }
              }
            else
              {
              if( verifie_champs() )
                  ecrit_lien(data,oldkey,edit);
              else    mess_erreur("Tous les champs (sauf description)","
obligatoires!");
              autre = 0;
              }
            }
        else
```

```
                {
                autre = 0;
                i = 0;
                }
            cle = llitf_str(6,40,data[0],20);
            break;
        case K_F2:
            autre = 1;
            break;
        case K_F10:
            rep = confirm("Edition de données terminée (O/N) ?");
            if(rep == 'o'|| rep == 'O')
                {
                recu_box();
                return(0);
                }
            else
                {
                if(i == 0)
                    cle = llitf_str(6,40,data[0],20);
                else
                    cle = lecture(i,data[i]);
                }
            break;
        default:
            break;
        }
    if(autre)
        break;
    }
    while(1);
    }
recu_box();
} effacer_lien()
{
int cle, rep, autre;

clean_data();
save_box(1,1,25,80);

while(1)
    {
    autre = 0;
    window(1,1,25,80," Effacer un lien ",1);
    set_fore(co8); set_back(co2);
    c_print(18,14,"Choisissez le lien à effacer");
    c_print(19,14,"et tapez <ENTER>");
    set_fore(co6);  set_back(co5);
    c_print(25,1,"
            ");
    c_print(25,2,"<ESC> Quitter - <^Y> Suiv. - <^X> Préc. - <PgDn> Page suiv. - <P
Page préc.");
```

```
    reset_att();

if(choisir_lien() == -1)
    {
    recu_box();
    return(0);
    } ecran_edit(" Effacer un lien ",efface);
    reset_att();

att_reverse();
    affiche_data();
    reset_att();

do
    {
    cle = clav();
    switch(cle)
        {
        case ESC:
          recu_box();
          return(0);
          break;
        case K_F1:
          rep = confirm("Effacer ce lien (O/N) ?");
          if(rep == 'o'|| rep == 'O')
              efface_lien(data[0]);
          autre = 1;
          break;
        case K_F2:
          autre = 1;
          break;
        case K_F10:
          rep = confirm("Effacement de liens terminé (O/N) ?");
          if(rep == 'o'|| rep == 'O')
              {
              recu_box();
              return(0);
              }
          else
              autre = 0;
          break;
        default:
          break;
        }
    if(autre)
        break;
    }
    while(1);
    } /* fin while(1) */
recu_box();
}
```

```
 intchoisir_lien()
{
char noms[21][21];
char descr[21][21];
char tel_m[21][21];
char ban_m[21][3];
char rel_m[21][3];
char tel_e[21][21];
char ban_e[21][3];
char rel_e[21][3];

char pos_blk[128], key[21];
int nbrec = 0;
int cle, STA, len, i, ligne;

len = sizeof(rec);
set_fore(co7) set_back(co3);
window (2,55,24,79," Liens ",2);
set_fore(co1) set_back(co2);
c_print(3,4,"Description du lien :");
c_print(5,4,"Téléphone / Local    :");
c_print(7,4,"Position / Local:");
c_print(8,8,"# banque             :");
c_print(9,8,"# relais             :");
c_print(11,4,"Téléphone / Eloigné :");
c_print(13,4,"Position / Eloigné:");
c_print(14,8,"# banque             :");
c_print(15,8,"# relais             :");

STA = BTRV(OPEN,pos_blk,&rec,&len,"liens.dbf",key,0);
switch(STA)
    {
    case 0:
    break;
    case 12:
    mess_erreur("Le fichier LIENS.DBF est inexistant","Opération annullée");
    break;
    case 20:
    mess_erreur("BTRIEVE n'est pas en mémoire","Opération annullée");
    break;
    default:
    erreur(1,0,STA);
    break;
    }
if(STA)
    return(-1);

STA = BTRV(FIRST,pos_blk,&rec,&len,key,0);
if(STA)
    {
    erreur(4,0,STA);
    return(-1);
    }
```

```c
while
{
if (STA != 9)
{
nbrec = 0;
ligne = 0;
reset_att();
clean_edt(3,56,23,78);
for (i = 0 ; i <= 20 ; i ++)
    {
    if (STA != 9)
        {
        sprintf(noms[i],"%s",rec.nom);
        sprintf(descr[i],"%s",rec.desc);
        sprintf(tel_m[i],"%s",rec.tel_master);
        sprintf(ban_m[i],"%s",rec.banque);
        sprintf(rel_m[i],"%s",rec.relais);
        sprintf(tel_e[i],"%s",rec.tel_slave);
        sprintf(ban_e[i],"%s",rec.banque2);
        sprintf(rel_e[i],"%s",rec.relais2);
        c_print(3 + i,57,noms[i]);
        STA = BTRV(NEXT,pos_blk,&rec,&len,key,0);
        nbrec++;
        }
    }
}
if(ligne == 0)
{
set_fore(co2); set_back(co1);
c_print (3,57,noms[0]);
c_print(3,26,descr[0]);
c_print(5,26,tel_m[0]);
c_print(8,26,ban_m[0]);
c_print(9,26,rel_m[0]);
c_print(11,26,tel_e[0]);
c_print(14,26,ban_e[0]);
c_print(15,26,rel_e[0]);
reset_att();
}
do
{
cle = clav();
switch(cle)
    {
    case F_B:
     if (ligne < nbrec - 1)
        {
        set_fore(co1);  set_back(co2);
        c_print (3+ligne,57,noms[ligne]);
        ligne++;
        set_fore(co2);  set_back(co1);
        c_print (3+ligne,57,noms[ligne]);
        c_print(3,26,descr[ligne]);
```

```
                c_print(5,26,tel_m[ligne]);
                c_print(8,26,ban_m[ligne]);
                c_print(9,26,rel_m[ligne]);
                c_print(11,26,tel_e[ligne]);
                c_print(14,26,ban_e[ligne]);
                c_print(15,26,rel_e[ligne]);
                reset_att();
                }
          break;
         case F_H:
           if(ligne > 0)
                {
                set_fore(co1);  set_back(co2);
                c_print (3+ligne,57,noms[ligne]);
                ligne--;
                set_fore(co2);  set_back(co1);
                c_print (3+ligne,57,noms[ligne]);
                c_print(3,26,descr[ligne]);
                c_print(5,26,tel_m[ligne]);
                c_print(8,26,ban_m[ligne]);
                c_print(9,26,rel_m[ligne]);
                c_print(11,26,tel_e[ligne]);
                c_print(14,26,ban_e[ligne]);
                c_print(15,26,rel_e[ligne]);
                reset_att();
                }
          break;
         case PG_UP:
           for(i = 0; i < 42; i++)
                {
                STA = BTRV(PREV,pos_blk,&rec,&len,key,0);
                }
          break;
         case ESC:
           STA = BTRV(CLOSE,pos_blk,&rec,&len,key,-1);
           if(STA)
                erreur(3,0,STA);
           return(-1);
           break;
         case ENTER:
           STA = BTRV(EQUAL,pos_blk,&rec,&len,noms[ligne],0);
           sprintf(data[0],"%s",rec.nom);
           sprintf(data[1],"%s",rec.desc);
           sprintf(data[2],"%s",rec.tel_master);
           sprintf(data[3],"%s",rec.banque);
           sprintf(data[4],"%s",rec.relais);
           sprintf(data[5],"%s",rec.tel_slave);
           sprintf(data[6],"%s",rec.banque2);
           sprintf(data[7],"%s",rec.relais2);
           break;
         }
    if(cle == PG_UP)
         STA = 0;
    }
```

```
    while (cle != PG_DN && cle != ENTER && cle != PG_UP);
    if(cle == ENTER)
    break;
    }
STA = BTRV(CLOSE,pos_blk,&rec,&len,key,-1);
if(STA)
    erreur(3,0,STA);
return(1);
} lecture(int num,char *champ)
{
char tmp[] = "   ";
char buffer[] = "   ";
int ligne, col, longueur, touche, rel, bank, stat;
int vide = 0;

switch(num)
    {
    case 0:
    ligne = 6;   col = 40;   longueur = 20;

do
        {
        touche = llitf_str(ligne,col,champ,longueur);
        if(touche == ESC || touche == K_F10)
         break;
        else
         {
         stat = verifie_cle(champ);
         if(stat)
            mess_erreur("Ce nom existe déjà dans le fichier","Utilisez un autre
!");
         if(strcmp(champ,"                    ") == 0)
            {
            vide = 1;
            mess_erreur("Le nom du lien est obligatoire","Appuyer sur une touche..
            }
         else vide = 0;
         }
        }
    while(stat || vide);
    break;
    case 1:
    ligne = 8;   col = 40;   longueur = 20;

touche = llitf_str(ligne,col,champ,longueur); /* lecture des donnees */
    break;
    case 2:
    ligne = 10;   col = 40;   longueur = 20;

do
        {
        touche = llitf_int(ligne,col,champ,longueur);
```

```
    if(touche == ESC || touche == K_F10)
     break;
    else
      {
      if(strcmp(champ,"                    ") == 0)
          {
          vide = 1;
          mess_erreur("Le numéro de téléphone local","est obligatoire");
          }
      else vide = 0;
      }
    }
while(vide);
break;
 case 3:
ligne = 13;   col = 40;    longueur = 2;

do
    {
    touche = llitf_int(ligne,col,champ,longueur);
    if(touche == ESC || touche == K_F10)
     break;
    else
      {
      if(strcmp(champ," ") == 0)
          {
          vide = 1;
          mess_erreur("Le # de banque est obligatoire","Appuyer sur une touche..
          }
      else vide = 0;
      }
    bank = atoi(champ);
    if(bank > 15 && !vide)
      mess_erreur("Le # de banque doit être compris","entre 0 et 15 inclusivemen
    }
while(bank > 15 || vide);

if(bank < 10)
    {
    strcpy(tmp,"0");
    itoa(bank,buffer,10);
    strcat(tmp,buffer);
    sprintf(champ,"%s",tmp);
    }
att_reverse();
c_print(ligne,col+1,champ);
reset_att();
break;
 case 4:
ligne = 14;   col = 40;    longueur = 2;

do
    {
```

```
      touche = llitf_int(ligne,col,champ,longueur);
      if(touche == ESC || touche == K_F10)
        break;
      else
        {
        if(strcmp(champ,"    ") == 0)
            {
            vide = 1;
            mess_erreur("Le # de relais est obligatoire","Appuyer sur une touche..
            }
         else vide = 0;
         }
      rel = atoi(champ);
      if(rel > 11 && !vide)
        mess_erreur("Le # de relais doit être compris","entre 0 et 11 inclusivemen
      }
  while(rel > 11 || vide);
  if(rel < 10)
      {
      strcpy(tmp,"0");
      itoa(rel,buffer,10);
      strcat(tmp,buffer);
      sprintf(champ,"%s",tmp);
      }
  att_reverse();
  c_print(ligne,col+1,champ);
  reset_att();
  break;
   case 5:
  ligne = 16;   col = 40;    longueur = 20;

do
      {
      touche = llitf_int(ligne,col,champ,longueur);
      if(touche == ESC || touche == K_F10)
        break;
      else
        {
        if(strcmp(champ,"                    ") == 0)
            {
            vide = 1;
            mess_erreur("Le numéro de téléphone éloigné","est obligatoire");
            }
         else vide = 0;
         }
      }
  while(vide);
  break;
   case 6:
  ligne = 19;   col = 40;    longueur = 2;

do
      {
      touche = llitf_int(ligne,col,champ,longueur);
```

```c
    if(touche == ESC || touche == K_F10)
     break;
    else
      {
      if(strcmp(champ,"   ") == 0)
         {
          vide = 1;
          mess_erreur("Le # de banque est obligatoire","Appuyer sur une touche..
         }
      else vide = 0;
      }
    bank = atoi(champ);
    if(bank > 15 && !vide)
      mess_erreur("Le # de banque doit être compris","entre 0 et 15 inclusivemen
    }
while(bank > 15 || vide);

if(bank < 10)
    {
    strcpy(tmp,"0");
    itoa(bank,buffer,10);
    strcat(tmp,buffer);
    sprintf(champ,"%s",tmp);
    }
att_reverse();
c_print(ligne,col+1,champ);
reset_att();
break;
case 7:
ligne = 20;   col = 40;   longueur = 2;

do
    {
    touche = llitf_int(ligne,col,champ,longueur);
    if(touche == ESC || touche == K_F10)
     break;
    else
      {
      if(strcmp(champ,"   ") == 0)
         {
          vide = 1;
          mess_erreur("Le # de relais est obligatoire","Appuyer sur une touche..
         }
      else vide = 0;
      }
    rel = atoi(champ);
    if(rel > 11 && !vide)
      mess_erreur("Le # de relais doit être compris","entre 0 et 11 inclusivemen
    }
while(rel > 11 || vide);
if(rel < 10)
    {
    strcpy(tmp,"0");
    itoa(rel,buffer,10);
```

```
            strcat(tmp,buffer);
            sprintf(champ,"%s",tmp);
            }
        att_reverse();
        c_print(ligne,col+1,champ);
        reset_att();
        break;
        }
return(touche);
} etablir_lien()
{
char mess[40];
char out[40];
char rep[] = "        ";
int stat, i;

clean_data();
save_box(1,1,25,80);

window(1,1,25,80," Téléphoner ",1);
set_fore(co8);set_back(co2);
c_print(18,14,"Choisissez le lien à établir");
c_print(19,14,"et tapez <ENTER>");
set_fore(co6);set_back(co5);
c_print(25,1,"                                                                              ");
c_print(25,2,"<ESC> Quitter - <^Y> Suiv. - <^X> Préc. - <PgDn> Page suiv. - <PgUp> préc.");
reset_att();

if(choisir_lien() == -1)
    {
    recu_box();
    return(-1);
    }
recu_box();

set_c();
info_lien();

reset_modem();
statut("Un moment s.v.p....");

for(i = 0;i < strlen(data[2]);i++)
    if(data[2][i] == 'P')
    data[2][i] = ',';       /* pause 2 secondes */
for(i = 0;i < strlen(data[5]);i++)
    if(data[5][i] == 'P')
    data[5][i] = ',';

str_trim(data[2]);      /* enlever les blancs a la fin du numero */
```

```
                              %s\r",data[2]);                               sprintf(out,"ATD
modem_comm(out);

delai(150L);
stat = modem_stat(rep);
switch(stat)
    {
     case 0:
    analyse_rep_modem(rep,mess);
    statut(mess);
    break;
     case -1:
    stat = modem_stat(rep);
    analyse_rep_modem(rep,mess);
    statut(mess);
    recu_box();
    ONLINE = 0;
    return(-1);
    break;
     case -2:
    analyse_rep_modem(rep,mess);
    statut(mess);
    recu_box();
    ONLINE = 0;
    return(-1);
    break;
    }
if(rep[0] == '0' || rep[0] == '1' || rep[0] == '5')
    {
    ONLINE = 1;
    set_fore(co2);  set_back(co1);
    c_print(9,59," ");
    }
else
    {
    ONLINE = 0;
    recu_box();
    return(-1);
    } flushc();
c_move(12,59);

delai(150L);
stat = command("[SM",rep);
if(command_stat(stat,rep,0) )
    {
    if(!set_rel(data[3],data[4]) )
    {
    recu_box();
    statut("Erreur activation du relais / Local");
    hang_up();
    return(-1);
```

```
        }
    }
else
    {
    recu_box();
    statut("Erreur sur commande / Local");
    hang_up();
    return(-1);
    }
set_fore(co2);set_back(co1);
c_print(12,59," ");
c_move(15,59);

stat = command("[S1",rep);
if(!command_stat(stat,rep,1) )
    {
    recu_box();
    statut("Erreur sur commande / Eloigné");
    hang_up();
    return(-1);
    }
str_trim(data[5]);

reset_modem();

statut("Un moment s.v.p....");
sprintf(out,"ATDT %s\r",data[5]);
modem_comm(out);

delai(150L);
sprintf(rep,"        ");
stat = modem_stat(rep);
switch(stat)
    {
     case 0:
    analyse_rep_modem(rep,mess);
    statut(mess);
    break;
     case -1:
    stat = modem_stat(rep);
    analyse_rep_modem(rep,mess);
    statut(mess);
    recu_box();
    hang_up();
    return(-1);
    break;
     case -2:
    analyse_rep_modem(rep,mess);
    statut(mess);
    recu_box();
    hang_up();
    return(-1);
    break;
    }
```

```
    if(rep[0]0' || rep[0] == '1' || rep[0] == '5')
    {
    ONLINE = 1;
    set_fore(co2);  set_back(co1);
    c_print(15,59," ");
    }
else
    {
    hang_up();
    recu_box();
    return(-1);
    } flushc();
c_move(18,59);

#ifdef RELAIS_ESCLAVE
delai(150L);
stat = command("[S1",rep);
if(command_stat(stat,rep,0) )
    {
    if(!set_rel(data[6],data[7]) )
    {
    recu_box();
    .statut("Erreur activation du relais / Eloigné");
    hang_up();
    return(-1);
    }
    }
else
    {
    recu_box();
    statut("Erreur sur commande / Eloigné");
    hang_up();
    return(-1);
    }
endif set_fore(co2) ;set_back(co1);
c_print(18,59," ");

bell();
delai(150L);

set_fore(co8) ;set_back(co2);
recu_box();
str_trim(data[0]);
sprintf(mess," Lien actif: %s ",data[0]);
att_bold();
c_print(22,(80 - strlen(mess))/2,mess);
reset_att();
return(1);
}
```

```c
reset_modem()
{
statut("Reset du modem...");
modem_comm("ATQ0V0E1 S7=30\r");
} hang_up()
{
char rep[] = "      ";
char mess[40];
int stat;

stat = command("[SM",rep);
command_stat(stat,rep,0);

delai(150L);
statut("Fin de la communication...");
tputstr("+++");
stat = modem_stat(rep);

modem_comm("ATH0\r");
stat = modem_stat(rep);

switch(stat)
    {
     case 0:
    analyse_rep_modem(rep,mess);
    if(rep[0] != '0')
        statut(mess);
    else
        {
        ONLINE = 0;
        statut("La ligne a été raccrochée");
        }
    break;
     case -1:
    stat = modem_stat(rep);
    analyse_rep_modem(rep,mess);
    statut(mess);
    break;
     case -2:
    analyse_rep_modem(rep,mess);
    statut(mess);
    break;
    } c_print(22,20,"===================================================");
}
analyse_rep_modem(char *rep, char *message)
{
switch(rep[0])
    {
    case '0':
    sprintf(message,"OK");
```

```c
    break;
 case '1':
sprintf(message,"CONNECT 2400");
break;
 case '2':
sprintf(message,"RING");
break;
 case '3':
sprintf(message,"NO CARRIER");
no_carrier();
break;
 case '4':
sprintf(message,"ERROR");
break;
 case '5':
sprintf(message,"CONNECT 1200");
break;
 case '6':
sprintf(message,"NO DIALTONE");
break;
 case '7':
sprintf(message,"BUSY");
break;
 case '8':
sprintf(message,"NO ANSWER");
break;
 default:
sprintf(message,"REPONSE DU MODEM INVALIDE: *%c*",rep[0]);
break;
   }
} info_lien()
{
char bank_hex[] = "  ";
char rel_hex[]= "  ";
char pos_maitre[] = "   ";
char pos_esclave[] = "   ";
int num;

num = atoi(data[3]);
int2hex(num,bank_hex);
num = atoi(data[4]);
int2hex(num,rel_hex);
sprintf(pos_maitre,"%c%c",bank_hex[0],rel_hex[0]);

num = atoi(data[6]);
int2hex(num,bank_hex);
num = atoi(data[7]);
int2hex(num,rel_hex);
sprintf(pos_esclave,"%c%c",bank_hex[0],rel_hex[0]);

save_box(6,19,20,61);
set_fore(co2);set_back(co1);
```

```
                                        Communication (6,21), 20, 61,"
set_fore(co2);set_back(co1);
c_print(8,21,"Etablissement du lien LOCAL");
c_print(9,21,"# ");
c_print(9,23,data[2]);
c_print(9,44,"..............");
c_print(11,21,"Allumage du relais / local");
c_print(12,21,"Position # ");
c_print(12,32,pos_maitre);
c_print(12,44,"..............");
c_print(14,21,"Etablissement du lien ELOIGNE");
c_print(15,21,"# ");
c_print(15,23,data[5]);
c_print(15,44,"..............");
c_print(17,21,"Allumage du relais / éloigné");
c_print(18,21,"Position # ");
c_print(18,32,pos_esclave);
c_print(18,44,"..............");
c_move(9,59);
} int set_rel(char *bank,char *relais)
{
char bank_hex[] = "  ";
char rel_hex[]  = "  ";
char comm[]     = "      ";
char ret[]      = "      ";
int num, etat;

num = atoi(bank);
int2hex(num,bank_hex);
num = atoi(relais);
int2hex(num,rel_hex);

sprintf(comm,"[R%c%c",bank_hex[0],rel_hex[0]);
etat = command(comm,ret);
return( command_stat(etat,ret,0) );
} clean_data()
{
sprintf(data[0],"                    ");
sprintf(data[1],"                    ");
sprintf(data[2],"                    ");
sprintf(data[3],"   ");
sprintf(data[4],"   ");
sprintf(data[5],"                    ");
sprintf(data[6],"   ");
sprintf(data[7],"   ");
} affiche_data()
{
c_print(6,41,data[0]);
```

```
                        c_print(8,41,data[1]);
c_print(10,41,data[2]);
c_print(13,41,data[3]);
c_print(14,41,data[4]);
c_print(16,41,data[5]);
c_print(19,41,data[6]);
c_print(20,41,data[7]);
} int verifie_champs()
{
if(strcmp(data[0],"                    ") == 0)  return(0);
if(strcmp(data[2],"            .       ") == 0)  return(0);
if(strcmp(data[5],"                    ") == 0)  return(0);
if(strcmp(data[3]," ") == 0)  return(0);
if(strcmp(data[4]," ") == 0)  return(0);
if(strcmp(data[6]," ") == 0)  return(0);
if(strcmp(data[7]," ") == 0)  return(0);
return(1);
}
```

```
#define    K_F1    259
#define    K_F2    260
#define    K_F3    261
#define    K_F4    262
#define    K_F5    263
#define    K_F6    264
#define    K_F7    265
#define    K_F8    266
#define    K_F9    267
define    K_F10   268 define    F_D 277
define    F_G 275
#define    F_H 272
define    F_B 280 define    HOME 271
define    END    279
#define    PG_UP 273
#define    PG_DN 281
#define    DEL    283
#define    INS    282
#define    BACK 8
#define    ESC    27
#define    RET    13
define    ENTER 13 define ALT_D 232
define ALT_E 218
#define ALT_I 223
#define ALT_M 250
```

```c
/*** MODEM.C: ***/
#include <STDIO.H>
#include <STDLIB.H>
#include <CTYPE.H>
#include <DOS.H>
#include <time.h>
#include <sys\types.h>
#include <sys\timeb.h>
#include "touche.c"

define  DELAI 125L union REGS regs;
extern int co1, co2, co3, co4, co5, co6, co7, co8;

unsigned tx_buf   = 0x2F8;
unsigned rx_buf   = 0x2F8;
unsigned div_lsb  = 0x2F8;
unsigned div_msb  = 0x2F9;
unsigned int_ena  = 0x2F9;
unsigned int_id   = 0x3FA;
unsigned lcr_a    = 0x2FB;
unsigned mcr_a    = 0x2FC;
unsigned lsr_a    = 0x2FD;
unsigned msr_a    = 0x2FE;

union {
  struct {
    unsigned word:2;
    unsigned stop:1;
    unsigned parite:1;
    unsigned even:1;
    unsigned stick:1;
    unsigned brea:1;
    unsigned dlab:1;
  } b;
  int i;
} lcr;

union {
  struct{
    unsigned dr:1;
    unsigned or:1;
    unsigned pe:1;
    unsigned fe:1;
    unsigned bi:1;
    unsigned thre:1;
    unsigned tsre:1;
    } b;
  int i;
```

```
    lsr; } union {
  struct {
    unsigned dtr:1;
    unsigned rts:1;
    unsigned out1:1;
    unsigned out2:1;
    unsigned loop:1;
  } b;
  int i;
} mcr;

int offset = 0;

bell()
{
  cputs("\007");
} init_com1(com,baud,parity,stop,word)
int com,baud,parity,stop,word;
{
  int msb,lsb;

if(com == 3 || com == 4)
    {
    tx_buf   = 0x2E8;
    rx_buf   = 0x2E8;
    div_lsb  = 0x2E8;
    div_msb  = 0x2E9;
    int_ena  = 0x2E9;
    lcr_a    = 0x2EB;
    mcr_a    = 0x2EC;
    lsr_a    = 0x2ED;
    msr_a    = 0x2EE;
    }
  switch(com)
    {
    case 1:
    case 3:
    offset = 0x100;
    break;
    case 2:
    case 4:
    offset = 0;
    break;
    } if( baud == 300  ) { lsb = 0x80; msb = 0x01; }
  if( baud == 600  ) { lsb = 0xC0; msb = 0x00; }
  if( baud == 1200 ) { lsb = 0x60; msb = 0x00; }
  if( baud == 2400 ) { lsb = 0x30; msb = 0x00; }
```

```
  if( baud == 4800 ) { lsb = 0x18; msb = 0x00; }
  if( baud == 9600 ) { lsb = 0x0C; msb = 0x00; } if(parity == 'O')      { lcr.b.parite = 1; lcr.b.even = 0; }
  else if(parity == 'E') { lcr.b.parite = 1; lcr.b.even = 1; }
  else lcr.b.parite = 0;

if(stop == 2) lcr.b.stop = 1;
  else          lcr.b.stop = 0;

if(word == 7) lcr.b.word = 2;
  else          lcr.b.word = 3;

lcr.b.dlab = 1;
  outp( lcr_a + offset , lcr.i );
  outp( div_msb + offset , msb );
  outp( div_lsb + offset , lsb );
  lcr.b.dlab = 0;
  outp( lcr_a + offset , lcr.i );
} int clave()
{
  int kc;
  if( (kc = getche()) == 0 ) kc = getche() + 200;
  return(kc);
} int clav()
{
  int kc;
  if( (kc = getch()) == 0 ) kc = getch() + 200;
  return(kc);
} extern int port;
struct timeb timebuf;
long time1, time2;
long inter = 0;
long t1, t2;  long inter2 = 0;

delai(long hsecondes)
{
initime(hsecondes);
while ( !timeout() )
     ;
}
initime(long hsecs)
{
inter = (hsecs < 12) ? 12 : hsecs;
ftime(&timebuf);
time1 = (long)timebuf.millitm/10 + timebuf.time*100;
}
```

```c
initime2(longdel)
{
inter2 = (del < 12) ? 12 : del;
ftime(&timebuf);
t1 = (long)timebuf.millitm/10 + timebuf.time*100;
} timeout()
{
ftime(&timebuf);
time2 = (long)timebuf.millitm/10 + timebuf.time*100;
return( (time2 - time1 > inter) ? 1 : 0 );
} timeout2()
{
ftime(&timebuf);
t2 = (long)timebuf.millitm/10 + timebuf.time*100;
return( (t2 - t1 > inter2) ? 1 : 0 );
}
flushc()
{
   while( tgetc_t(1000L) != 0 );
}
int modem_comm(char *comm)
{
int i = 0;

delai(100L);

while (comm[i] != '\0')
    tputc(comm[i++]);
return(i);
} int modem_stat(char *rep)
{
char c;
int k;

flushc();
initime(18000L);

do
    {
    if( kbhit() )
        {
        if( (k = clav() ) == ESC)
         {
         tputc(k);
         return(-1);
         }
        }
```

```
    if(timeout())
        return(-2);
    c = tgetc_t2( DELAI );
    if(isdigit(c) )
        {
        rep[0] = c;
        return(0);
        }
    }
    while(!isdigit(c) );
} tputstr(str)
char str[];
{
    int i;

i = 0;
    while (str[i] != 0)
    tputc(str[i++]);
    return(i);
} tputc(c)
{
 regs.h.ah = 0x01;
 switch(port)
     {
     case 1:
     regs.x.dx = 0x00;   /* com1 */
     break;
      case 2:
     regs.x.dx = 0x01;   /* com2 */
     break;
      case 3:
     regs.x.dx = 0x02;   /* com3 */
     break;
      case 4:
     regs.x.dx = 0x03;   /* com4 */
     break;
     }
 regs.h.al = c;
 int86( 0x14 , ®s , ®s );
} tgetc_t2(long temps)
{
int tm_out = 0;

initime2(temps);
lsr.b.dr = 0;
while ( !(tm_out = timeout2() ) && !lsr.b.dr)
    {
```

```c
    lsr.i = inp( lsr_a + offset );
    if( tm_out )
  return(0);
    if( lsr.b.dr )
    return( inp( rx_buf + offset ) );
    }
} tgetc_t(ii)
long ii;
{
  long i;

lsr.b.dr = 0;
  for(i=0 ; i<ii && lsr.b.dr==0 ; i++) lsr.i = inp( lsr_a + offset );
  if( i >= ii )
     return(0);
  return( inp( rx_buf + offset ) );
} ready()
{
 regs.h.ah = 0x03;
 switch(port)
     {
     case 1:
     regs.x.dx = 0x00;    /* com1 */
     break;
     case 2:
     regs.x.dx = 0x01;    /* com2 */
     break;
     case 3:
     regs.x.dx = 0x02;    /* com3 */
     break;
     case 4:
     regs.x.dx = 0x03;    /* com4 */
     break;
     }
 int86( 0x14 , ®s , ®s );
 return(regs.x.ax & 0x100);
} no_carrier()
{
save_box(9,20,14,61);
set_fore(co7) set_back(co2);
window(9,20,14,61," NO CARRIER ",2);
set_fore(co1) set_back(co2);
c_print(11,23,"Le modem ne détecte pas le \"carrier\"");
c_print(12,26,"La communication est coupée !");
bell(); clav();
recu_box();
}
```

```
 command(char*in,char *out)
{
tputstr(in);
lit_rep(out);
} int lit_rep(char *rep)
{
int i, tm_out = 0, rdy = 0;

flushc();
initime(300L);

while ( !(tm_out = timeout() ) && !(rdy = ready()) )
     ;

if(tm_out)
    {
    if(!(regs.h.al & 0x80) )
    return(-1);
    else
    return(-2);
    } if(rdy)
    {
    rep[0] = tgetc_t2( DELAI );
    return(0);
    }
} int command_stat(int etat,char *rep,int module)
{
switch(etat)
    {
    case -1:
    no_carrier();
    break;
    case -2:
    bell();   statut("Timeout... Aucune réponse reçue");
    break;
    case 0:
    switch(rep[0])
        {
        case ']':
         return(1);
         break;
        default:
         if(module == 0)
              statut("Erreur d'exécution de la commande / Local");
         else
              statut("Erreur d'exécution de la commande / Eloigné");
         break;
        }
```

```c
        break;
    }
return(0);
} int get_db(float *signal)
{
int i = 0;
char valeur[] = "      ";
float db = 0.0;

tputstr("[D");
do
    {
    valeur[i] = tgetc_t2( DELAI );
    if( valeur[i] == 0 )
    break;
    i++;
    }
while (valeur[i-1] != '\r');
if(!strcmp(valeur,"") )
    return(0);
sscanf(valeur,"%f",&db);
*signal = db;
return(1);
} int2hex(int num,char *conv)
{
    switch (num)   {
    case 15: conv[0] = 'F';
            break;
    case 14: conv[0] = 'E';
            break;
    case 13: conv[0] = 'D';
            break;
    case 12: conv[0] = 'C';
            break;
    case 11: conv[0] = 'B';
            break;
    case 10: conv[0] = 'A';
            break;
    case 9 : conv[0] = '9';
            break;
    case 8 : conv[0] = '8';
            break;
    case 7 : conv[0] = '7';
            break;
    case 6 : conv[0] = '6';
            break;
    case 5 : conv[0] = '5';
            break;
    case 4 : conv[0] = '4';
            break;
```

```
        case 3 : conv[0] = '3';
                break;
        case 2 : conv[0] = '2';
                break;
        case 1 : conv[0] = '1';
                break;
        case 0 : conv[0] = '0';
                break;
        default: conv[0] = '0';
        }
}
```

```c
                         /*** MAIN.C ***/
#include "samdi.h"
int Msignal = 1;
int Esignal = 1;
extern int ONLINE;
int co1 = 7, co2 = 0, co3 = 0, co4 = 7, co5 = 7, co6 = 0, co7 = 7,
    co8 = 7;

main()
{
int cle, start;

if(init_gcard() == 1)
    {
    co1 = 7;
    co2 = 0;
    co3 = 0;
    co4 = 15;
    co5 = 9;
    co6 = 7;
    co7 = 12;
    co8 = 14;
    } start = spawnl(P_WAIT,"btrieve.exe","btrieve",NULL);
if(start == -1)
    {
    printf("Erreur avec gestionnaire de base de données, code = %d\n",start);
    printf("Le fichier BTRIEVE.EXE doit être dans le même répertoire que SAMDI.EX
    bell();   exit(-1);
    }
init_com1(1,2400,'N',1,8);

ecran_id();
ecran1();
while(1)
    {
    if( ONLINE && (Msignal || Esignal) )
    lit_signal();
    if( kbhit() )
     {
    cle = clav();
    switch(cle)
        {
        case 'c':
        case 'C':
         menu_comm();
         break;
        case 'l':
        case 'L':
         menu_maitre();
         break;
        case 'e':
        case 'E':
```

```
              menu_esclave();
              break;
            case 'b':
            case 'B':
              balayage();
              break;
            case 'i':
            case 'I':
              inform();
              break;
            default:
              break;
            }
        }
     }
} lit_signal()
{
float signal = 0.0;
extern int Mlect, Mponttx, Elect, Eponttx;
int etat;
char reponse[2];
char texte[10];

if(Mlect)
    {
    etat = command("[S0",reponse);
    if(command_stat(etat,reponse,0) )
    {
    etat = command("[F1004",reponse);
    if(command_stat(etat,reponse,0) )
        {
        Msignal = 1;
        if( get_db(&signal) )
          {
          Msignal = 1;
          if(Mponttx)
              {
              clean_edt(4,16,4,26);
              if(signal > 0.0)
                sprintf(texte,"> 0.0 dbm");
              else
                sprintf(texte,"%4.1f dbm",signal);
              c_print(4,17,texte);
              }
            else
              {
              clean_edt(20,16,20,26);
              if(signal > 0.0)
                sprintf(texte,"> 0.0 dbm");
              else
                sprintf(texte,"%4.1f dbm",signal);
              c_print(20,17,texte);
```

```
              }
          }
          else  Msignal = 0;
        }
    else  Msignal = 0;
    }
     else  Msignal = 0;
      }
if(!Msignal)
    statut("Erreur de lecture du signal / Local");

if(Elect)
      {
      etat = command(" [S1",reponse);
      if(command_stat(etat,reponse,1) )
      {
      etat = command(" [F1004",reponse);
      if(command_stat(etat,reponse,0) )
          {
          Esignal = 1;
          if( get_db(&signal) )
            {
            Esignal = 1;
            if(Eponttx)
                {
                clean_edt(20,54,20,64);
                if(signal > 0.0)
                  sprintf(texte,"> 0.0 dbm");
                else
                  sprintf(texte,"%4.1f dbm",signal);
                c_print(20,55,texte);
                }
            else
                {
                clean_edt(4,54,4,64);
                if(signal > 0.0)
                  sprintf(texte,"> 0.0 dbm");
                else
                  sprintf(texte,"%4.1f dbm",signal);
                c_print(4,55,texte);
                }
            }
          else  Esignal = 0;
          }
      else  Esignal = 0;
      }
      else  Esignal = 0;
      }
if(!Esignal)
    statut("Erreur de lecture du signal / Eloigné");
}
```

```c
/*** BALAYAGE.C ***/
#include "samdi.h"
#include "touche.c"
#include <malloc.h>
#include <stdlib.h>
#include <bios.h>
int vmode = 0;
struct videoconfig vc;
extern int co1, co2, co3, co4, co5, co6, co7, co8, ONLINE;
extern char *data[];
int etat, compense = 0;
char reponse[2];
char testinfo[80];

balayage()
{
char texte[40];

if(!_setvideomode(_MAXRESMODE) )
    {
    vmode = 0;
    statut("La carte vidéo ne supporte pas le mode graphique");
    return(-1);
    }
else  vmode = 1;
_registerfonts("*.fon");
_clearscreen(_GCLEARSCREEN);
_getvideoconfig(&vc);

menu_balayage();

_unregisterfonts();
_setvideomode(_DEFAULTMODE);
vmode = 0;
erase();
ecran1();
if(ONLINE)
    {
    set_fore(co8); set_back(co2);
    sprintf(texte," Lien actif: %s ",data[0]);
    att_bold();
    c_print(22,(80 - strlen(texte))/2,texte);
    reset_att();
    }
} long del = 100L;

menu_balayage()
{
```

```
    inti, cle, direction = -1, gen = -1, fin = 0, sauve = 0, ligne = 0;
char texte[80];
char origine[] = "      ";
char dest[] = "    ";
float valeur[28];

_settextcolor(15);   _settextposition(1,1);    _outtext("L");
_settextcolor(7);    _settextposition(1,2);    _outtext("ocal->éloigné|");
_settextcolor(15);   _settextposition(1,16);   _outtext("E");
_settextcolor(7);    _settextposition(1,17);   _outtext("loigné->local|");
_settextposition(1,31); _outtext("gén");
_settextcolor(15);   _settextposition(1,35);   _outtext("0");
_settextcolor(7);    _settextposition(1,36);   _outtext("|gén -");
_settextcolor(15);   _settextposition(1,43);   _outtext("8");
_settextcolor(7);    _settextposition(1,44);   _outtext("|");
_settextcolor(15);   _settextposition(1,45);   _outtext("T");
_settextcolor(7);    _settextposition(1,46);   _outtext("race|");
_settextcolor(15);   _settextposition(1,51);   _outtext("I");
_settextcolor(7);    _settextposition(1,52);   _outtext("mprime|");
_settextcolor(15);   _settextposition(1,59);   _outtext("R");
_settextcolor(7);    _settextposition(1,60);   _outtext("écupère|");
_settextcolor(15);   _settextposition(1,68);   _outtext("S");
_settextcolor(7);    _settextposition(1,69);   _outtext("auve|");
_settextcolor(15);   _settextposition(1,74);   _outtext("Q");
_settextcolor(7);    _settextposition(1,75);   _outtext("uitte");
dessine_graph(0);

for(i = 0;i < 28;i++)
    valeur[i] = 0.0;
do
    {
    cle = clav();
    switch(cle)
    {
    case '1':
    case 'L':
        if(!ONLINE)
          statut("Aucun lien actif!");
        else
          {
          _settextcolor(4); _settextposition(2,1); _outtext("═══════════════");
          ");
          direction = 0;
          statut("Direction: Local -> Eloigné");
          }
        break;
    case 'e':
    case 'E':
        if(!ONLINE)
          statut("Aucun lien actif!");
        else
          {
          _settextcolor(4); _settextposition(2,1); _outtext("═══════════════");
          ");
```

```
               direction = 1;
               statut("Direction: Eloigné -> Local");
               }
           break;
    case '0':
          if(!ONLINE)
              statut("Aucun lien actif!");
          else
              {
              _settextcolor(4); _settextposition(2,31); _outtext("===          ");
              gen = 0;
              compense = -16;
              statut("Générateur: 0 db");
              }
          break;
    case '8':
          if(!ONLINE)
              statut("Aucun lien actif!");
          else
              {
              _settextcolor(4); _settextposition(2,31); _outtext("          ===");
              gen = 8;
              compense = -8;
              statut("Générateur: -8 db");
              }
          break;
    case 't':
    case 'T':
          if(!ONLINE)
              statut("Aucun lien actif!");
          else
              {
              if(direction == -1)
                  {
                  sprintf(texte,"Choisir   d'abord   la   direction   (Local->Eloigne
Eloigne->Local)");
                  statut(texte);
                  break;
                  }
              if(gen == -1)
                  {
                  sprintf(texte,"Choisir d'abord la fréquence du générateur (0 / -8 db
                  statut(texte);
                  break;
                  }
              if(setup_balayage(direction, gen, origine, dest) )
                  {
                  dessine_graph(1);
                  statut("Balayage de fréquences en cours...");
                  if(run_balayage(direction, &valeur, origine, dest, ligne) )
                     {
                     bell();  infos(direction,gen);     sauve = 1;
                     }
                  else
```

```
                    {
                    statut("Opération annulée!");
                    dessine_graph(1); sauve = 0;
                    }
                  }
                }
            break;
        case 'i':
        case 'I':
            if(test_printer() == 0)
             print();
            else  box_mess("Vérifier l'imprimante!");
            break;
        case 's':
        case 'S':
            sauve_graph(&valeur);
            break;
        case 'r':
        case 'R':
            recupere_graph(&valeur);
            break;
        case 'q':
        case 'Q':
            fin = 1;
            if(ONLINE)
              {
               reset_maitre();   reset_esclave();
              }
            break;
        }
      }
while(!fin);
} int xorg, yorg, xfin, yfin, xinter, yinter, xlong, ylong;

dessine_graph(int line)
{
char texte[40];
int i, nb, oldcolor;

_settextcolor(14);
_settextposition(3,21);
_outtext("DISTORSION D'AFFAIBLISSEMENT RELATIVE");
_setfont("t'helv'h12w7b");
if(vc.numxpixels == 720)
     {
     xlong = 608;
     xinter = 18;
     }
else
     {
```

```
    xlong = vc.numxpixels * 0.85;
    xinter = xlong / 32;
    }
xorg = (vc.numxpixels - xlong) / 2;
xfin = xorg + xlong;
ylong = vc.numypixels * 0.7;
yorg = vc.numypixels - ( (vc.numypixels - ylong) / 2);
yfin = vc.numypixels - yorg;
yinter = ylong / 12;
if(line)
    {
    _setviewport(0,yfin - 5,vc.numxpixels,vc.numypixels); /*yorg + 30);*/
    _clearscreen(_GVIEWPORT);
    _setviewport(0,0,vc.numxpixels,vc.numypixels);
    }

_setcolor(12);
_moveto(xorg,yorg);
_lineto(xfin,yorg);/* x */
_moveto(xorg,yorg);
_lineto(xorg,yfin);/* y */

_moveto(xfin,yorg);
_lineto(xfin - 10,yorg + 8);
_moveto(xfin,yorg);
_lineto(xfin - 10,yorg - 8); /* x */
_moveto(xorg,yfin);
_lineto(xorg - 8,yfin + 10);
_moveto(xorg,yfin);
_lineto(xorg + 8,yfin + 10); /* y */

_rectangle(_GBORDER, xorg, yfin + yinter, xfin - xinter, yorg);

_setcolor(7);
for(i = 1, nb = -2;i <= 11;i++,nb++)
    {
    _moveto(xorg - 5,(yorg - yinter * i) );
    _lineto(xfin - xinter,(yorg - yinter * i) );
    _moveto(xorg - 25,(yorg - yinter * i) - 5 );
    if(nb > 0)
    sprintf(texte,"+%d",nb);
     else if(nb < 0)
    sprintf(texte," %d",nb);
     else
        sprintf(texte," %2d",nb); /* 0 */
    _outgtext(texte);
    }
_moveto(3,(yorg - yinter * 3) );
_setgtextvector(0,1);
_setcolor(14);
_outgtext("Affaiblissement relatif (dB)");
_setgtextvector(1,0);
```

```c
        = 0, nb = 0;i <fo82;i++)
    {
    if( !(i % 5) )
    {
    _setlinestyle(0xFFFF);
    _moveto(xorg + (xinter * i),yorg + 8); _setcolor(12);
    }
    else
    {
    _setlinestyle(0xCCCC);
    _moveto(xorg + (xinter * i),yorg + 5); _setcolor(7);
    }
    _lineto(xorg + (xinter * i),yfin + yinter );
    if( !(i % 5) || i == 0 )
    {
    _setcolor(7);
    _moveto(xorg + (xinter * i - 10),yorg + 12);
    sprintf(texte,"%d",nb);
    _outgtext(texte);
    nb += 500;
    }
    }
sprintf(texte,"Fréquence (Hz)");
_moveto( (vc.numxpixels - _getgtextextent(texte) ) / 2,yorg + 27);
_setcolor(14);
_outgtext(texte);

_setlinestyle(0xFFFF);
_setcolor(3); /* cyan */ if(vc.mode != _HERCMONO)
    {
    _rectangle(_GBORDER, xorg + (xinter * 3), yfin + yinter + 1, xorg + (xinter *
yorg - (yinter * 9) );
    _rectangle(_GBORDER, xorg + (xinter * 3) + 1, yfin + yinter + 2, xorg + (xint
30) - 1, yorg - (yinter * 9) - 1);

_rectangle(_GBORDER, xorg + (xinter * 5), yorg - (yinter * 9), xorg + (xinter *
yorg - (yinter * 6) );
    _rectangle(_GBORDER, xorg + (xinter * 5) + 1, yorg - (yinter * 9), xorg + (xi
* 28) - 1, yorg - (yinter * 6) - 1);

_rectangle(_GBORDER, xorg + (xinter * 5), yorg - (yinter * 2), xorg + (xinter *
yorg - yinter);
    _rectangle(_GBORDER, xorg + (xinter * 5) + 1, yorg - (yinter * 2) + 1, xo
(xinter * 28) - 1, yorg - yinter);

_rectangle(_GBORDER, xorg + (xinter * 3), yorg - yinter, xorg + (xinter * 30),
- 1);
    _rectangle(_GBORDER, xorg + (xinter * 3) + 1, yorg - yinter + 1, xorg + (xint
30) - 1, yorg - 1);
    oldcolor = _setcolor(0);
    _floodfill(xorg + (xinter * 3) + 2, yfin + yinter + 3, oldcolor);
```

```
        _floodfill(xorg + (xinter * 5) + 2, yorg - (yinter * 9) + 2, oldcolor);
        _floodfill(xorg + (xinter * 5) + 2, yorg - (yinter * 2) + 2, oldcolor);
        _floodfill(xorg + (xinter * 3) + 2, yorg - yinter + 2, oldcolor);
      }
  else
      {
         _rectangle(_GFILLINTERIOR, xorg + (xinter * 3), yfin + yinter + 1, xorg + (xi
 * 30), yorg - (yinter * 9) );
         _rectangle(_GFILLINTERIOR, xorg + (xinter * 3) + 1, yfin + yinter + 2, xo
 (xinter * 30) - 1, yorg - (yinter * 9) - 1);

_rectangle(_GFILLINTERIOR, xorg + (xinter * 5), yorg - (yinter * 9), xorg + (xi
 * 28), yorg - (yinter * 6) );
         _rectangle(_GFILLINTERIOR, xorg + (xinter * 5) + 1, yorg - (yinter * 9), xo
 (xinter * 28) - 1, yorg - (yinter * 6) - 1);

_rectangle(_GFILLINTERIOR, xorg + (xinter * 5), yorg - (yinter * 2), xorg + (xi
 * 28), yorg - yinter);
         _rectangle(_GFILLINTERIOR, xorg + (xinter * 5) + 1, yorg - (yinter * 2) + 1,
 + (xinter * 28) - 1, yorg - yinter);

_rectangle(_GFILLINTERIOR, xorg + (xinter * 3), yorg - yinter, xorg + (xinter *
 yorg - 1);
         _rectangle(_GFILLINTERIOR, xorg + (xinter * 3) + 1, yorg - yinter + 1, xo
 (xinter * 30) - 1, yorg - 1);
         oldcolor = _setcolor(0);
         _rectangle(_GFILLINTERIOR, xorg + (xinter * 3) + 2, yfin + yinter + 3, xo
 .(xinter * 30) - 2, yorg - (yinter * 9) - 2);
         _rectangle(_GFILLINTERIOR, xorg + (xinter * 5) + 2, yorg - (yinter * 9), xo
 (xinter * 28) - 2, yorg - (yinter * 6) - 2);
         _rectangle(_GFILLINTERIOR, xorg + (xinter * 5) + 2, yorg - (yinter * 2) + 2,
 + (xinter * 28) - 2, yorg - yinter - 1);
         _rectangle(_GFILLINTERIOR, xorg + (xinter * 3) + 2, yorg - yinter + 2, xo
 (xinter * 30) - 2, yorg - 2);
      }
 _moveto(xorg + (xinter * 5) + 1, yorg - (yinter * 9) );
 _lineto(xorg + (xinter * 28) - 1, yorg - (yinter * 9) );
 _moveto(xorg + (xinter * 5) + 1, yorg - yinter);
 _lineto(xorg + (xinter * 28) - 1, yorg - yinter);

_moveto(xorg + (xinter * 5) + 1, yorg - (yinter * 9) - 1);
 _lineto(xorg + (xinter * 28) - 1, yorg - (yinter * 9) - 1);
 _moveto(xorg + (xinter * 5) + 1, yorg - yinter + 1);
 _lineto(xorg + (xinter * 28) - 1, yorg - yinter + 1);

_setcolor(10);
 _setfont("t'helv'h18w9b");
 sprintf(texte,"COND. 4B (C2)");
 _moveto( (vc.numxpixels - _getgtextextent(texte) ) / 2,yorg - (yinter * 10) );
 _outgtext(texte);
 }
```

```
    intsetup_balayage(int direction, int gen, char *origine, char *dest)
{
char generateur[] = "     ";
char texte[80];
int stat_origine = 0;
int stat_dest = 0;

if(direction == 0)
    {
    sprintf(origine,"[S0");
    sprintf(dest,"[S1");
    }
else
    {
    sprintf(origine,"[S1");
    sprintf(dest,"[S0");
    }
if(gen == 0)
    sprintf(generateur,"[M8C");
else    sprintf(generateur,"[MCC");

etat = command(origine,reponse);
if(command_stat(etat,reponse,direction) )
    {
    etat = command(generateur,reponse);
    if(command_stat(etat,reponse,direction) )
    stat_origine = 1;
    } etat = command(dest,reponse);
if(command_stat(etat,reponse,direction) )
    {
    etat = command("[M0E",reponse);
    if(command_stat(etat,reponse,direction) )
        stat_dest = 1;
    }
if(stat_origine && stat_dest)
    return(1);
else    return(0);
} int run_balayage(int direction, float *valeur, char *origine, char *dest, int li
{
float lect = 0.0;
int frequence, i;
char tmp[]    = "     ";
char buffer[] = "     ";
char freq[]   = "     ";

for(i = 0,frequence = 300;frequence <= 3000;i++,frequence += 100)
    {
```

```
    if(kbhit() )
        return(0);
     etat = command(origine,reponse);
     if(command_stat(etat,reponse,0) )
      {
     if(frequence < 1000)
          {
          strcpy(tmp,"0");
          itoa(frequence,buffer,10);
          strcat(tmp,buffer);
          sprintf(freq,"[F%s",tmp);
          }
     else
          {
          itoa(frequence,buffer,10);
          sprintf(freq,"[F%s",buffer);
          }
      etat = command(freq,reponse);
      if(command_stat(etat,reponse,0) )
          {
          delai(del);
          etat = command(dest,reponse);
          if(command_stat(etat,reponse,0) )
            {
            if( get_db(&lect) )
                {
                valeur[i] = compense - lect;
                plot(frequence,&valeur[i],ligne);
                }
             else
                valeur[i] = 255.0;
            }
          }
      }
     }
return(1);
} plot(int freq, float *dbval, int ligne)
{
static int oldx, oldy, newx, newy;

_setcolor(15);
oldx = newx;   oldy = newy;
newx = xorg + (xinter * (freq/100)) - 5;
newy = yorg - (int)(yinter * (*dbval + 3.0)) - 6;
_moveto (newx,newy);

if(freq > 300)
      {
      _moveto(oldx+5,oldy+5);
      _lineto(newx+5,newy+5);
      _moveto(oldx+5,oldy+6);
      _lineto(newx+5,newy+6);
```

```
        _moveto(oldx+5,oldy+7);
        _lineto(newx+5,newy+7);
        ligne = 1;
        }
} infos(int dir, int gen)
{
char date[9];
char heure[9];
char hr[6];
char sens[10];
char type_gen[10];

_strdate(date);
_strtime(heure);
strncpy(hr,heure,5);
hr[5] = '\0';

if(dir == 0)
    sprintf(sens,"Loc->Eloi");
else
    sprintf(sens,"Eloi->Loc");
if(gen == 0)
    sprintf(type_gen,"Gén 0 db");
else
    sprintf(type_gen,"Gén -8 db");
sprintf(testinfo,"%s %s %s %s %s",data[0],date,hr,sens,type_gen);
statut(testinfo);
} sauve_graph(float *valeur)
{
int i;
FILE * fic;
char nom[] = "                                                    ";

if(!lit_nom("Sauver le graphique sous le nom:",nom) )
    return(0);
else
    {
    if( (fic = fopen(nom,"w+")) == NULL )
    {
    box_mess("Erreur d'ouverture du fichier");
    return(-1);
    }
    for(i = 0;i < 28;i++)
    fprintf(fic,"%3.1f,",valeur[i]);
    fprintf(fic,"%s",testinfo);

if( fclose(fic) )
```

```
      box_mess("Erreur de fermeture du fichier");
      }
} recupere_graph(float *valeur)
{
int i, frequence, nb;
FILE * fic;
char nom[] = "                                                        ";

if(!lit_nom("Nom du graphique à récupérer:",nom) )
     return(0);
else
     {
     if( (fic = fopen(nom,"r")) == NULL )
     {
     box_mess("Erreur d'ouverture du fichier");
     return(-1);
     }
      for(i = 0;i < 28;i++)
      {
      nb = fscanf(fic,"%f,",&valeur[i]);
      if(!nb)
           {
           box_mess("Ce fichier est incompatible"); return(-1);
           }
      }
      fread(testinfo,80,80,fic);
      for(i = 0,frequence = 300;frequence <= 3000;i++,frequence += 100)
      if(valeur[i] != 255.0)
          plot(frequence,&valeur[i],0);
      statut(testinfo);
      if( fclose(fic) )
      box_mess("Erreur de fermeture du fichier");
      }
} lit_nom(char *mess, char *nom)
{
int i, x1, y1, x2, y2, xpix_car, ypix_car, cle, col, line, oldcolor;
char *box;

x1 = (int)(vc.numxpixels * 0.2);
y1 = (int)(vc.numypixels * 0.35);
x2 = (int)(vc.numxpixels * 0.8);
y2 = (int)(vc.numypixels * 0.6);
xpix_car = vc.numxpixels/vc.numtextcols;
ypix_car = vc.numypixels/vc.numtextrows;
line = (int)(y1/ypix_car);
col = (80 - strlen(mess) ) / 2;
```

```
            = malloc( (unsigned int)_imagesize(x1,y1,x2,y2) );
_getimage( x1,y1,x2,y2, box);
if(vc.mode != _HERCMONO)
    {
    _setcolor(5);
    _rectangle(_GBORDER, x1,y1,x2,y2);
    _rectangle(_GBORDER, x1+1,y1+1,x2-1,y2-1);
    _rectangle(_GBORDER, x1+4,y1+4,x2-4,y2-4);
    _rectangle(_GBORDER, x1+5,y1+5,x2-5,y2-5);
    oldcolor = _setcolor(0);
    _floodfill(x1 + 6,y1 + 6,oldcolor);
    }
else
    {
    _setcolor(5);
    _rectangle(_GFILLINTERIOR, x1,y1,x2,y2);
    _rectangle(_GFILLINTERIOR, x1+1,y1+1,x2-1,y2-1);
    oldcolor = _setcolor(0);
    _rectangle(_GFILLINTERIOR, x1+4,y1+4,x2-4,y2-4);
    _rectangle(_GFILLINTERIOR, x1+5,y1+5,x2-5,y2-5);
    }
_settextcolor(14);
_settextposition(line + 3, col);
_outtext(mess);
_settextcolor(7);
_settextposition(line + 5, col);
for(i = 0;i < 40;i++)
    {
    cle = getch();
    switch(cle)
    {
    case ESC:
        _putimage(x1, y1, box, _GPSET);
        free(box);
        return(0);
        break;
    case ENTER:
        nom[i] = '\0';
        _putimage(x1, y1, box, _GPSET);
        free(box);
        return(1);
        break;
    case BACK:
        nom[i--] = ' ';
        nom[i--] = ' ';
        _settextposition(line + 5, col);
        _outtext(nom);
        break;
    default:
        if(i < 39)
          nom[i] = toupper(cle);
        else
          {
          nom[i] = '\0';
```

```
                _putimage(x1, y1, box, _GPSET);
                free(box);
                return(1);
                }
            _settextposition(line + 5, col);
            _outtext(nom);
            break;
        }
        }
} print()
{
int x = 0, y = 0, mode,  col, mult, ydebut, yfin;
unsigned char ct,ct2,ct3,ct4,ct5,ct6,ct7,ct8;
unsigned char res, total;

if(vc.numxpixels > 767)
    {
    col = vc.numxpixels - 768;    mode = 7;   mult = 3;
    }
else if(vc.numxpixels == 720)
    {
    col = vc.numxpixels - 512;    mode = 6;   mult = 2;
    }
      else
    {
    col = vc.numxpixels - 512;    mode = 4;   mult = 2;
    } ydebut = (vc.numypixels / vc.numtextrows) * 2 + 1;
if(vc.numypixels == 350)
    yfin = 344;
/*else    yfin = vc.numypixels - 3;*/
if(vc.numypixels == 480)
    yfin = 464;
fprintf (stdprn,"%c3%c",27,24);
fprintf (stdprn,"%cU%c",27,1);
for(x = 0; x < 5; x++)
    fprintf(stdprn,"\n");

for (y = ydebut;y <= yfin;y += 8)
    {
    fprintf (stdprn,"%c*%c%c%c",27,mode,col,mult);
    for(x = 0 ; x < vc.numxpixels; x++)
        {
        total =0;
        res = _getpixel(x,y);
        ct  = ( (res != 0 ) ? 1 : 0);
        res = _getpixel(x,y+1);
        ct2 = ( (res != 0 ) ? 1 : 0);
        res = _getpixel(x,y+2);
        ct3 = ( (res != 0 ) ? 1 : 0);
        res = _getpixel(x,y+3);
```

```
    ct4 = ( (res != 0 ) ? 1 : 0);
    res = _getpixel(x,y+4);
    ct5 = ( (res != 0 ) ? 1 : 0);
    res = _getpixel(x,y+5);
    ct6 = ( (res != 0 ) ? 1 : 0);
    res = _getpixel(x,y+6);
    ct7 = ( (res != 0 ) ? 1 : 0);
    res = _getpixel(x,y+7);
    ct8 = ( (res != 0 ) ? 1 : 0);

total = (ct*128) +(ct2*64) + (ct3*32) +(ct4*16)+(ct5*8)+(ct6*4)+(ct7*2)+ct8;
    fprintf (stdprn,"%c",total);
    }
     fprintf (stdprn,"\n");
     }
fprintf(stdprn,"\014");
} int test_printer()
{
unsigned data = 36;
unsigned status;

status = _bios_printer(_PRINTER_STATUS,0,data); /* 0 =LPT1 */
switch(status)
    {
    case 144:
         return(0);
    case 24:
         return(1);
    case 176:
         return(2);
    case 48:
         return(3);
    case 192:
         return(4);
    }
} box_mess(char *mess)
{
int x1, y1, x2, y2, xpix_car, ypix_car, col, line, oldcolor;
char *box;

x1 = (int)(vc.numxpixels * 0.2);
y1 = (int)(vc.numypixels * 0.4);
x2 = (int)(vc.numxpixels * 0.8);
y2 = (int)(vc.numypixels * 0.6);
xpix_car = vc.numxpixels/vc.numtextcols;
ypix_car = vc.numypixels/vc.numtextrows;
line = (int)(y1/ypix_car);
```

```
            = (80 - strlen(mess) )c012;

box = malloc( (unsigned int)_imagesize(x1,y1,x2,y2) );
_getimage( x1,y1,x2,y2, box);
if(vc.mode != _HERCMONO)
    {
    _setcolor(5);
    _rectangle(_GBORDER, x1,y1,x2,y2);
    _rectangle(_GBORDER, x1+1,y1+1,x2-1,y2-1);
    _rectangle(_GBORDER, x1+4,y1+4,x2-4,y2-4);
    _rectangle(_GBORDER, x1+5,y1+5,x2-5,y2-5);
    oldcolor = _setcolor(0);
    _floodfill(x1 + 6,y1 + 6,oldcolor);
    }
else
    {
    _setcolor(5);
    _rectangle(_GFILLINTERIOR, x1,y1,x2,y2);
    _rectangle(_GFILLINTERIOR, x1+1,y1+1,x2-1,y2-1);
    oldcolor = _setcolor(0);
    _rectangle(_GFILLINTERIOR, x1+4,y1+4,x2-4,y2-4);
    _rectangle(_GFILLINTERIOR, x1+5,y1+5,x2-5,y2-5);
    }
_settextcolor(14);
_settextposition(line + 3, col);
_outtext(mess);
bell();
clav();
_putimage(x1, y1, box, _GPSET);
free(box);
}
```

```
/*** ECRANS.C ***/
#include "samdi.h"
extern int co1, co2, co3, co4, co5, co6, co7, co8;
extern int vmode;
extern struct videoconfig vc;

ecran1()
{
erase();
c_move(1,1);  clr_c();

set_fore(co1) set_back(co2);
window(1,1,22,80,"",2);
set_fore(co7) set_back(co2);
window(23,1,25,80,"",2);
att_bold();
c_print(25,36," Statut ");
reset_att();

set_fore(co6) set_back(co5);
c_print(1,2,"
     ");
menu_top(1,4,"Communication",1);
menu_top(1,19,"Local",1);
menu_top(1,26,"Eloigné",1);
menu_top(1,35,"Balayage de fréquences",1);
menu_top(1,74,"Info",1);
reset_att();

dessine_maitre();
dessine_esclave();
} dessine_maitre()
{
clean_edt(3,2,21,31);
window(7,10,17,32,"",1);
att_bold();
c_print(7,12," Local ");
reset_att();
hline(11,31,10,1);
hline(11,31,14,1);
c_print(10,10,"┤");
c_print(14,10,"┤");
c_print(10,32,"├");
c_print(14,32,"├");
dessine_lignes();
}
```

```
 dessine_esclave()
{
clean_edt(3,48,21,79);
window(7,48,17,70,"",1);
att_bold();
c_print(7,60," Eloigné ");
reset_att();
hline(49,69,10,1);
hline(49,69,14,1);
c_print(10,48,"┤");
c_print(14,48,"┤");
c_print(10,70,"├");
c_print(14,70,"├");
dessine_lignes();
} dessine_lignes()
{
hline(3,9,10,1);
hline(33,47,10,1);
hline(33,47,14,1);
hline(3,9,14,1);
hline(71,78,10,1);
hline(71,78,14,1);
c_print(10,9,"^P");
c_print(10,47,"^P");
c_print(14,33,"^Q");
c_print(14,71,"^Q");
} ecran_edit(char *titre,int mode)
{
window(1,1,25,80,titre,1);
if(mode != efface)
    {
    set_fore(co8); set_back(co2);
    c_print(3,16,"Entrez les informations nécessaires pour le lien");
    reset_att();
    }
c_print(6,18, "Nom du lien            :");
c_print(8,18, "Description            :");
c_print(10,18,"# téléphone local     :");
c_print(12,18,"Position local:");
c_print(13,22,"# banque              :");
c_print(14,22,"# relais              :");
c_print(16,18,"# téléphone éloigné:");
c_print(18,18,"Position éloigné:");
c_print(19,22,"# banque              :");
c_print(20,22,"# relais              :");
set_fore(co6) set_back(co5);

switch(mode)
```

```
    {
     case nouv:
     c_print(25,2,"                                                                   ");
     c_print(25,4,"<ESC> Annuler - <F1> Sauvegarder - <F10> Quitter");
     break;
     case edit:
     c_print(25,2,"
           ");
     c_print(25,3,"<ESC> Annuler - <F1> Sauvegarder - <F2> Choisir autre lien - <
Quitter");
     break;
      case efface:
      c_print(25,2,"
       ");
     c_print(25,3,"<ESC> Annuler - <F1> Effacer - <F2> Choisir autre lien - <
Quitter");
     break;
     }
} inform()
{ set_fore(co1);set_back(co2);
menu_top(1,74,"Info",1);
reset_att();

save_box(9,19,15,61);
set_fore(co7);set_back(co3);
window(9,19,15,61,"",2);
set_fore(co7);set_back(co3);
c_print(11,21,"S");
set_fore(co1);set_back(co2);
c_print(11,22,"ystème d'");
set_fore(co7);set_back(co3);
c_print(11,31,"A");
set_fore(co1);set_back(co2);
c_print(11,32,"ccès et de ");
set_fore(co7);set_back(co3);
c_print(11,43,"M");
set_fore(co1);set_back(co2);
c_print(11,44,"esure à ");
set_fore(co7);set_back(co3);
c_print(11,52,"DI");
set_fore(co1);set_back(co2);
c_print(11,54,"stance");
c_print(12,24,"Version 1.0 (c) Hydro-Québec 1991");
c_print(13,30,"Conçu par Trioniq Inc");
clav();
recu_box();
```

```
        set_back(co5);
menu_top(1,74,"Info",1);
reset_att();
} statut(char *mess)
{
int ligne;

if(!vmode)
    {
    set_fore(co8); set_back(co2);
    clean_edt(24,3,24,78);
    c_print(24,4,mess);
    reset_att();
    }
else
    {
    _settextcolor(14);
    if(vc.numtextrows == 30)
    ligne = 29;
     else ligne = vc.numtextrows;
    _settextposition(ligne,1);
    _outtext("
         ");
    _settextposition(ligne,(80 - strlen(mess)) / 2);
    _outtext(mess);
    _settextcolor(7);
    }
} mess_erreur(char *txt1, char *txt2)
{
save_box(9,20,14,61);
set_fore(co7);set_back(co2);
window(9,20,14,61," Erreur ",2);
set_fore(co1);set_back(co2);
c_print(11,(80 - strlen(txt1))/2,txt1);
c_print(12,(80 - strlen(txt2))/2,txt2);
bell();  clav();
set_fore(co1);set_back(co2);
recu_box();
}
```

```
confirm(char*message)
{
int rep;

save_box(21,20,23,60);
set_fore(co7);set_back(co2);
window(21,20,23,60," Confirmation ",2);
set_fore(co1);set_back(co2);
c_print(22,(80 - strlen(message))/2,message);
do
    {
    rep = clav();
    }
while(rep != 'o' && rep != 'O' && rep != 'n' && rep != 'N');
recu_box();
return(rep);
} str_trim(char *str)
{
char tempo[30];
int i, fin;

strcpy(tempo,str);
i = strlen(tempo);
while(isspace(tempo[--i]) )
    ;
fin = i + 1;
for(i = 0;i < fin;i++)
    {
    tempo[i] = str[i];
    ;
    }
tempo[fin] = '\0';
strcpy(str,tempo);
} ecran_id()
{
int x1, y1, x2, y2, posx, nbypix, dim, i, j, sta_fon;
struct xycoord polyside[8];

if(!_setvideomode(_MAXRESMODE) )
    {
    vmode = 0;
    return(-1);
    }
else  vmode = 1;
```

```
                    _clearscreen(_GCLEARSCREEN);
_getvideoconfig(&vc);

sta_fon = _registerfonts("*.fon");
switch(sta_fon)
    {
    case -1:
    _settextcolor(15);
    _settextposition(15,22);
    _outtext("Le fichier HELVB.FON est introuvable"); bell();
    break;
    case -3:
    case -2:
    _settextcolor(15);
    _settextposition(15,21);
    _outtext("Le fichier HELVB.FON est endommagé"); bell();
    break;
    default:
    break;
    }
nbypix = vc.numypixels / vc.numtextrows;

switch(vc.numypixels)
    {
    case 350:
    case 348:
    dim = 70;
    break;
    case 200:
    dim = 40;
    break;
    case 480:
    default:
    dim = 100;
    break;
    }
x1 = (vc.numxpixels - dim) / 2;
y1 = (vc.numypixels / 10);
x2 = x1 + dim;
y2 = y1 + dim;
_setcolor(12);
_rectangle(_GBORDER, 1, 1, vc.numxpixels - 1, vc.numypixels - 1);

_setcolor(14);
_ellipse(_GBORDER,x1 - 5, y1 - 5, x2 + 5, y2 + 5);
_ellipse(_GBORDER,x1 - 4, y1 - 4, x2 + 4, y2 + 4);
_ellipse(_GBORDER,x1 - 3, y1 - 3, x2 + 3, y2 + 3);
_ellipse(_GBORDER,x1 - 2, y1 - 2, x2 + 2, y2 + 2);
_ellipse(_GBORDER,x1 - 1, y1 - 1, x2 + 1, y2 + 1);
_ellipse(_GBORDER,x1, y1, x2, y2);
_ellipse(_GBORDER,x1 + 1, y1 + 1, x2 - 1, y2 - 1);
_ellipse(_GBORDER,x1 + 2, y1 + 2, x2 - 2, y2 - 2);
_ellipse(_GBORDER,x1 + 3, y1 + 3, x2 - 3, y2 - 3);
_ellipse(_GBORDER,x1 + 4, y1 + 4, x2 - 4, y2 - 4);
```

```
                              + 5, y1 + 5, x2 - 5, y2 - 5);_ellipse(_GBORDER,x1
polyside[0].xcoord = x1 + (dim/2);
polyside[0].ycoord = y1 + (dim * .7);
polyside[1].xcoord = x1 + (dim/2) + 14;
polyside[1].ycoord = y1 + (dim * .7);
polyside[2].xcoord = x2 + 8;
polyside[2].ycoord = y2 - 7;
polyside[3].xcoord = x2 + 8;
polyside[3].ycoord = y1 + (int)(dim * .85);
polyside[4].xcoord = x2 + 35;
polyside[4].ycoord = y2 + 2;
polyside[5].xcoord = x2 + 15;
polyside[5].ycoord = y2 - 2;
polyside[6].xcoord = x2 + 15;
polyside[6].ycoord = y2 + 10;
polyside[7].xcoord = x1 + (dim/2);
polyside[7].ycoord = y1 + (dim * .7);
_polygon(_GFILLINTERIOR,polyside,8);

_setfont("t'helv'h15w8b");
_setcolor(15);
_moveto( (vc.numxpixels - _getgtextextent("REGION") ) / 2, y2 + (int)(nbypix * 1.5
/* y2 + 25 */
_outgtext("REGION");
_moveto( (vc.numxpixels - _getgtextextent("SAGUENAY") ) / 2, y2 + (int)(nbypix *
);/* y2 + 40 */
_outgtext("SAGUENAY");
_moveto( (vc.numxpixels - _getgtextextent("VERSION 1.0 1991") ) / 2,vc.numypixels
_setcolor(10);
_outgtext("VERSION 1.0 1991");
_setcolor(15);
_moveto(vc.numxpixels - 140,vc.numypixels - nbypix * 6);
_outgtext("DISTRIBUE PAR");
_moveto(vc.numxpixels - 125,vc.numypixels - nbypix * 5);
_outgtext("TRIONIQ INC.");
_moveto(vc.numxpixels - 125,vc.numypixels - nbypix * 4);
_outgtext("CHICOUTIMI");
_moveto(vc.numxpixels - 130,vc.numypixels - nbypix * 3);
_outgtext("(418) 696-0469");
_setfont("t'helv'h28w16b");
_setcolor(12);
_moveto(95,vc.numypixels - nbypix * 6);
_outgtext("S. A. M. DI.");

_setfont("t'helv'h18w9b");
if(vc.numypixels != 200)
    {
    _setcolor(3);
    for( i = 65, j = vc.numypixels - nbypix * 7; j < vc.numypixels -nbypix * 4;i--,
        {
        _moveto(i,j);
        _lineto(i + 25,j);
        }
```

```
        do
        {
        _moveto(i,j);
        _lineto(300,j);
        i--; j++;
        }
        while(i > 5);
        }
_setcolor(12);
posx = 20;
_moveto(posx,vc.numypixels - nbypix * 3);
_outgtext("S");
_setcolor(7);
posx += (_getgtextextent("S") + 3);
_moveto(posx,vc.numypixels - nbypix * 3);
_outgtext("ystème d' ");
_setcolor(12);
posx += _getgtextextent("ystème d' ");
_moveto(posx,vc.numypixels - nbypix * 3);
_outgtext("A");
_setcolor(7);
posx += (_getgtextextent("A") + 3);
_moveto(posx,vc.numypixels - nbypix * 3);
_outgtext("ccès et de ");
_setcolor(12);
posx += _getgtextextent("ccès et de ");
_moveto(posx,vc.numypixels - nbypix * 3);
_outgtext("M");
_setcolor(7);
posx += (_getgtextextent("M") + 3);
_moveto(posx,vc.numypixels - nbypix * 3);
_outgtext("esure à ");
_setcolor(12);
posx += _getgtextextent("esure à ");
_moveto(posx,vc.numypixels - nbypix * 3);
_outgtext("DI");
_setcolor(7);
posx += (_getgtextextent("DI") + 3);
_moveto(posx,vc.numypixels - nbypix * 3);
_outgtext("stance");

_setcolor(14);
_moveto( (vc.numxpixels - _getgtextextent("Tapez une touche...") ) / 2,vc.numypi
 - nbypix * 2 + 2);
_outgtext("Tapez une touche...");
clav();
_unregisterfonts();
_setvideomode(_DEFAULTMODE);
vmode = 0;
}
```

```c
#include <dos.h>
#include <bios.h>
#include <stdio.h>
#include "touche.c"
#include <ctype.h>
include <math.h> int ins_status=0;

int kc;
char fil[105][13];
long size[105];
int  posl[105] = { 3, 3, 3, 3, 3,    4, 4, 4, 4, 4,    5, 5, 5, 5, 5,
                   6, 6, 6, 6, 6,    7, 7, 7, 7, 7,    8, 8, 8, 8, 8,
                   9, 9, 9, 9, 9,    10,10,10,10,10,   11,11,11,11,11,
                   12,12,12,12,12,   13,13,13,13,13,   14,14,14,14,14,
                   15,15,15,15,15,   16,16,16,16,16,   17,17,17,17,17,
                   18,18,18,18,18,   19,19,19,19,19,   20,20,20,20,20,
                   21,21,21,21,21,   22,22,22,22,22,   23,23,23,23,23 };
int  posc[105] = { 4,19,34,49,64,    4,19,34,49,64,    4,19,34,49,64,
                   4,19,34,49,64,    4,19,34,49,64,    4,19,34,49,64,
                   4,19,34,49,64,    4,19,34,49,64,    4,19,34,49,64,
                   4,19,34,49,64,    4,19,34,49,64,    4,19,34,49,64,
                   4,19,34,49,64,    4,19,34,49,64,    4,19,34,49,64,
                   4,19,34,49,64,    4,19,34,49,64,    4,19,34,49,64,
                   4,19,34,49,64,    4,19,34,49,64,    4,19,34,49,64 };
int nfil;
int point = 0;
int kc_form;
int lng;

litf_int(lig,col,mess,idef)
int lig,col,*idef;
char mess[];
{
  int lmess,ldef,col1,i,j,icol;
  char str[20];

lng = 0;

lmess = strlen(mess);

col1 = col + lmess;
  sprintf(str," %d ",*idef);

kc_form = lit_1( lig,col1,str );

if(str[0] != '\0' || kc_form == ESC) sscanf(str,"%d",idef);
  sprintf(str," %d ",*idef);

if( kc_form >= 200 || kc_form == ESC) return(kc_form);
  return(0);
}
```

```
litf_float(lig,col,mess,iflt)
int lig,col;
char mess[];
float *iflt;
{
  int lmess,ldef,col1,i,j,icol;
  char str[20];

lng = 0;
  reset_att();
  lmess = strlen(mess);

col1 = col + lmess;
  sprintf(str," %.2f ",*iflt);

kc_form = lit_1( lig,col1,str );

if(str[0] != '\0' || kc_form == ESC) sscanf(str,"%f",iflt);
  sprintf(str," %.2f ",*iflt);

if( kc_form >= 200 || kc_form == ESC) return(kc_form);
  return(0);
} litf_str(lig,col,mess,str1)
int lig,col;
char mess[],str1[];
{
  int lmess,ldef,col1,i,j,icol;
  char str[80];

lng = 0;
  reset_att();
  lmess = strlen(mess);

col1 = col + lmess;
  sprintf(str," %s ",str1);

kc_form = lit_1( lig,col1,str );

if(str[0] != '\0' || kc_form == ESC) strcpy(str1,str);
  sprintf(str,"%s",str1);

if( kc_form >= 200 || kc_form == ESC) return(kc_form);
  return(0);
} llitf_float(lig,col,str,lg)
int lig,col,lg;
char *str;
{
kc_form = llitf_str (lig,col,str,lg);
```

```
              (str,"%10.4f");                    Tr_numb
c_print (lig,col+1,str);
return(kc_form);
} llitf_str(lig,col,str1,lg,cc)
int lig,col,lg;
char *str1;
{
  set_c();
  att_reverse();
  c_print (lig,col+1,str1);
  kc_form = lit_1( lig,col,str1,lg,cc );
  clr_c();
  reset_att();
  return(kc_form);
}

Tr_numb (char* ptr,char *f1)
{
    float temp = 0.0;

sscanf (ptr,"%f",&temp);
    sprintf (ptr,f1,temp);
} litf_file(lig,col,mess,str1,exten,l1,c1,l2,c2)
int lig,col,l1,c1,l2,c2;
char mess[],str1[],exten[];
{
  int i,j,flag;
  char temp[40],temp1[40];
  FILE *ifile;

kc_form = litf_str(lig,col,mess,str1);
  if( kc_form > 200 || kc_form == ESC ) return(-1);

flag = 0;
  for( i=0; i<strlen(str1) ; i++) if( str1[i] == '*' ) flag = 1;

strcpy( temp,str1 );
  strcat( temp,exten );

if( flag )
     {
     if( get_file( l1,c1,l2,c2, temp ,temp1) == -1 ) return(-1);
     clr_ext(temp1);
     strcat( temp , temp1 );
     strcpy( str1,temp );
     }
  else
     {
```

```
    ifile = fopen( temp ,"r");
    if( ifile == NULL ) return(0);
    fclose(ifile);
    clr_ext(temp);
    strcpy( str1,temp );
    } form (lig,col,mess,14);

return(1);
} form (lig,col,mess,ln)
int lig,col,ln;
char mess[];
{ c_print(lig,col-strlen(mess),mess);
  fblank (lig,col+1,ln);

} lit_1(lig,col1,str,lg,cc)
int lig,col1,lg;
char *str;
{
    int icol,i,ldef,dep,pt_col;
    int xx1=lig,yy1=col1;
    int x_ins=72;
    int y_ins=24;
    char push[80];

set_fore(0);
  set_back(7);
  sprintf (push,"%s",str);
  strnset (push,32,lg);

ldef = strlen(str);
  lng = lg;
  i=0;
  icol = col1+1;
  c_move(lig,col1+1);
  kc = 0;
  while( 1 )
  {
    kc = clav();
    switch (kc)
    {
        case K_F1 :
                return(K_F1);
                break;
        case K_F3 :
                return(K_F3);
```

```
                break;
        case K_F4 :
                sprintf (str,"%s",push);
                c_print (xx1,yy1+1,str);
                i=0;
                icol = col1+1;
                c_move (lig,icol);
                break;
        case F_D : if (i < lng)
                {
                i++;
                icol++;
                c_move(lig,icol);
                }
                break;
        case K_F2 :
                return(kc);
                break;
        case K_F6 :
                return(K_F6);
                break;
        case K_F5 :
                return(kc);
                break;
        case F_H :
                return(kc);
                break;
        case K_F9 :
                return(K_F9);
                break;
        case K_F10 :
                return(kc);
                break;
            case F_B :
                return(kc);
                break;
        case F_G : if (i >0 )
                {
                i--;
                icol--;
                c_move(lig,icol);
                }
                break;
        case K_F7 :
             return(K_F7);
             break;
        case K_F8 :
             return(K_F8);
             break;
        case 273 :       /****** Pg Up *****/
             return(273);
             break;
        case 281 :       /*** Pg Down ***/
             return(281);
```

```
            break;
case DEL  :
      if ( i < lg-1)
      {
            pt_col=icol;
            for(dep=i;dep<lg-1;dep++)
            {
            str[dep]=str[dep+1];
            c_move(lig,pt_col);
            put_car(str[dep]);
            pt_col++;
            }
            str[dep]=' ';
            c_move(lig,pt_col);
            put_car(str[dep]);
            c_move(lig,icol);
      }
      else if( i==(lg-1))
            {
            str[i]=' ';
            c_move(lig,icol);
            put_car(str[i]);
            }
      break;
case ESC  :
      return(kc);
      break;
case RET:
      return(kc);
      break;
case INS:
      if (ins_status==1)
      {
      reset_att();
      c_print(y_ins,x_ins,"        ");
      att_reverse();
      ins_status=0;
      }
      /* else c_print(y_ins,x_ins,"Insert"); */
      break;
case BACK  :
      if( i != 0)
            {
                  i--;
            icol--;
                  pt_col=icol;
            for(dep=i;dep<lg-1;dep++)
            {
                  str[dep]=str[dep+1];
                  c_move(lig,pt_col);
                  put_car(str[dep]);
                  pt_col++;
            }
            str[dep]=' ';
```

```
                c_move(lig,pt_col);
                    put_car(str[dep]);
                c_move(lig,icol);
            }
            break;
        default    :
            if ((_bios_keybrd(_KEYBRD_SHIFTSTATUS)& 128)==128)
                {
                /* c_print(y_ins,x_ins,"Ecraser"); */
                ins_status=1;
                if ((kc <200) &&( i < lng) )
                    {
                    pt_col=col1+lg;
                    for (dep=lg-1;dep>i;dep--)
                    {
                        str[dep]=str[dep-1];
                        c_move(lig,pt_col);
                        put_car(str[dep]);
                        pt_col--;
                    }
                    }
                }
                if ((kc <200) &&( i < lng) )
                    {
                    str[i] = toupper(kc);
                    c_move(lig,icol);
                    if( i < lng )
                    {
                    put_car(str[i]);
                        i++;
                        icol++;
                    c_move(lig,icol);
                    }
                }
        }
    }
    return(kc);
} get_file(l1,c1,l2,c2,path,nfich)
int l1,c1,l2,c2;
char path[],nfich[];
{
    int i,j,nlig,lig,col,pos,pos1,ncol,off_lig;
    struct find_t c_file;
    char str[80];

if( _dos_findfirst(path,_A_NORMAL,&c_file) != 0 ) return(-1);
    ncol = (c2-c1-1)/15;
    nlig = l2-l1-3;
    if( ncol <= 0 || nlig <= 0 ) return(-1);

strcpy( fil[0],c_file.name);
```

```
size[0] = c_file.size;
nfil = 1;
while( _dos_findnext(&c_file) == 0 )
  {
  strcpy(fil[nfil],c_file.name);
  size[nfil] = c_file.size;
  nfil++;
  if( nfil >= 100 )break;
  }
for( i=0 ; i<nfil ; i++)
  {
  posl[i] = i/ncol ;
  posc[i] = c1 + 2 + mod(i,ncol)*15;
  } save_box(l1,c1,l2,c2);
att_reverse();
c_box(l1,c1,l2,c2,0);
c_print(l2,c1+2,"OK: <RET>    SORTIE:<ESC>");
sprintf(str," FICHIER: %s ",path);
c_print(l1,c1+2,str);
reset_att();

pos = pos1 = 0;
for( i=0 ; i<nfil ; i++) if( strcmpi(fil[i],nfich) == 0 ) pos = i;
strcpy( str,fil[pos] );
strcpy( fil[pos],fil[0] );
strcpy( fil[0],str );
pos = 0;
off_lig = 0;

raf_fil(1,pos,pos1,&off_lig,ncol,nlig,nfil,l1,c1);

kc = 0;
while( kc != 13 && kc != ESC )
  {
  kc = clav();
  pos1 = pos;
  switch( kc )
     {
     case F_H:
                if( pos < ncol )break;
                pos = pos-ncol;
                raf_fil(0,pos,pos1,&off_lig,ncol,nlig,nfil,l1,c1);
                break;
     case F_B:  if( pos >= nfil-ncol )break;
                pos = pos+ncol;
                raf_fil(0,pos,pos1,&off_lig,ncol,nlig,nfil,l1,c1);
                break;
     case F_D:  if( pos >= nfil )break;
                pos++;
                raf_fil(0,pos,pos1,&off_lig,ncol,nlig,nfil,l1,c1);
                break;
     case F_G:  if( pos == 0 )break;
```

```c
                    pos--;
                    raf_fil(0,pos,pos1,&off_lig,ncol,nlig,nfil,l1,c1);
                    break;
            }
        }
    reset_att();
    recu_box();
    if( kc == ESC ) return(-1);
    strcpy(nfich,fil[pos]);

i = strlen(path)-1;
    while( path[i] != 92 && path[i] != ':'   && i>=0 )
        i--;
    path[i+1] = 0;

return(0);

} raf_fil(mod,pos,pos1,off_lig,ncol,nlig,nfil,l1,c1)
int mod,pos,pos1,*off_lig,ncol,nlig,nfil,l1,c1;
{
    int pl,pc,i;

pl = pos1[pos];
    if( pl < *off_lig || pl >= (*off_lig+nlig) || mod == 1)
        {
        if( pl < *off_lig && *off_lig > 0) *off_lig = *off_lig - 1;
        if( pl >= (*off_lig+nlig) )          *off_lig = *off_lig + 1;
        c_box( l1+1,c1+1,l1+nlig+1,c1+ncol*15,1);
        for( i=0 ; i<nfil ; i++)
            {
            pl = pos1[i] - *off_lig;
            if( pl < 0 || pl >= nlig ) continue;
            if( i == pos ) att_reverse();
            c_print( pl+l1+2 , posc[i] , fil[i] );
            c_move( pl+l1+2 , posc[i] );
            reset_att();
            }
        }
    else
        {
        c_print( pos1[pos1]+l1+2-*off_lig , posc[pos1] , fil[pos1] );
        att_reverse();
        c_print( pos1[pos]+l1+2-*off_lig , posc[pos] , fil[pos] );
        c_move( pos1[pos]+l1+2-*off_lig , posc[pos] );
        reset_att();
        }

} mod(i,d)
int i,d;
{
```

```
  double ff;
  return( (int)fmod( (double)i , (double)d ) );
} clr_ext(str)
char str[];
{
  int i;

i=0;
  while( str[i] != 0 )
    {
    if( str[i] == '.' ) { str[i] = 0; break; }
    i++;
    }
} llitf_int(lig,col,str1,lg,cc)
int lig,col,lg;
char *str1;
{
  set_c();
  att_reverse();
  c_print (lig,col+1,str1);
  kc_form = lit_2( lig,col,str1,lg,cc );
  clr_c();
  reset_att();
  return(kc_form);
}

/*** fonction modifiee 31.1.91 pour programme Hydro-Quebec pour accepter ***/
/*** un 'P' ou ',' afin d'indiquer une pause dans la commande au modem    ***/
/*** pour signaler les numeros de telephone ***/
lit_2(lig,col1,str,lg,cc)
int lig,col1,lg;
char *str;
{
   int flag = 0;
   int icol,i,ldef,dep,pt_col;
   int xx1=lig,yy1=col1;
   int x_ins=72;
   int y_ins=24;
   char push[80];

set_fore(0);
  set_back(7);
  sprintf (push,"%s",str);
  strnset (push,32,lg);

ldef = strlen(str);
  lng = lg;
  i=0;
  icol = col1+1;
  c_move(lig,col1+1);
```

```
kc = 0;
while( 1 )
{
  kc = clav();
  switch (kc)
  {
        case K_F1 :
            return(K_F1);
            break;
        case K_F2 :
                return(kc);
                break;
        case K_F3 :
                return(K_F3);
                break;
          case K_F4 :
                sprintf (str,"%s",push);
                c_print (xx1,yy1+1,str);
                i=0;
                icol = col1+1;
                c_move (lig,icol);
                break;
        case K_F5 :
                return(kc);
                break;
        case K_F6 :
                return(K_F6);
                break;
        case K_F7 :
                return(K_F7);
            break;
        case K_F8 :
            return(K_F8);
            break;
        case K_F9 :
                return(K_F9);
                break;
        case K_F10 :
                return(kc);
              break;
        case F_D : if (i < lng)
                {
                i++;
                icol++;
                c_move(lig,icol);
                }
                break;
        case F_H :

return(kc);
                break;
            case F_B :

return(kc);
```

```
              break;
case F_G : if (i >0 )
              {
              i--;
              icol--;
              c_move(lig,icol);
              }
              break;
case 273 :        /****** Pg Up *****/
       return(273);
       break;
case 281 :        /*** Pg Down ***/
       return(281);
       break;
case DEL :
       if ( i < lg-1)
       {
              pt_col=icol;
              for(dep=i;dep<lg-1;dep++)
              {
              str[dep]=str[dep+1];
              c_move(lig,pt_col);
              put_car(str[dep]);
              pt_col++;
              }
              str[dep]=' ';
              c_move(lig,pt_col);
              put_car(str[dep]);
              c_move(lig,icol);
       }
       else if( i==(lg-1))
              {
              str[i]=' ';
              c_move(lig,icol);
              put_car(str[i]);
              }
       break;
case ESC  :
       return(kc);
       break;
case RET:                            /* manon */
       return(kc);
       break;
/*case INS: *** enleve 6.2.91 (probleme avec insert) ***
       if (ins_status==1)
       {
       reset_att();
       c_print(y_ins,x_ins,"          ");
       att_reverse();
       ins_status=0;
       }
         else c_print(y_ins,x_ins,"Insert");
       break;    */
case 9         : /* tab */
```

```
                    break;
        case BACK :
            if( i != 0)
                {
                    i--;
                icol--;
                    pt_col=icol;
                for(dep=i;dep<lg-1;dep++)
                {
                        str[dep]=str[dep+1];
                        c_move(lig,pt_col);
                        put_car(str[dep]);
                        pt_col++;
                }
                str[dep]=' ';
                c_move(lig,pt_col);
                    put_car(str[dep]);
                c_move(lig,icol);

}break;
        default   :
            if ( (_bios_keybrd(_KEYBRD_SHIFTSTATUS)& 128) ==128)
                {
                /* c_print(y_ins,x_ins,"Ecraser");*/
                ins_status=1;
/*** modif 31.1.91 ***/     if ((kc > 47 && kc < 58 || kc == 'p' || kc == 'P' |
== '.') && (i < lng) )
                    {
                    pt_col=col1+lg;
                    for (dep=lg-1;dep>i;dep--)
                    {
                        str[dep]=str[dep-1];
                        c_move(lig,pt_col);
                        put_car(str[dep]);
                        pt_col--;
                    }
                    }
                }
            /*  else *** enleve  6.2.91 (probleme avec insert) ***
                    {
                    if (i == 0 && flag == 0)
                        {
                    sprintf (str,"%s",push);
                c_print (xx1,yy1+1,str);
                i=0;
                icol = col1+1;
                c_move (lig,icol);
                        flag = 1;
                }*/
/*** modif 31.1.91 ***/     if   ((kc >47 && kc <58 || kc == 'p' || kc == 'P' |
== '.') &&( i < lng) )
                {
                str[i] = toupper(kc);
                c_move(lig,icol);
```

```
                        if( i < lng )
                        {
                        put_car(str[i]);
                            i++;
                            icol++;
                        c_move(lig,icol);
                        }
                    }
            /*    ) 6.2.91 */
            }
        }
    return(kc);
}
```

Although the present invention has been explained hereinabove by way of a preferred embodiment thereof, it should be pointed out that any modifications of this preferred embodiment, within the scope of the appended claims is not deemed to change or alter the nature and scope of the invention.

I claim:

1. A testing unit located at an intermediate station for selecting and testing communication links of a first communication system interconnecting a plurality of remote stations and the intermediate station by means of a second communication system interconnecting modems located at each of the remote stations, each of the modems at the remote stations communicating with a control module located at each of the remote stations, wherein each of the control modules are connected to one of the links of the first communication system, the testing unit comprising:

a) a first communication modem for transmitting first data signals and command signals over the second communication system between the testing unit and an operator at a remote location provided with a computer and a modem connected to the computer;

b) a second communication modem for transmitting second data signals and the command signals over the second communication system between the testing unit and any selected one of the remote stations, wherein, in operation, communication is established over the second communication system between the computer and the selected one of the remote stations via the first and second modems of the testing unit;

c) a switching system having a control input for receiving a switch control signal, a plurality of circuit banks each connected to a respective one of the communication links of the first communication system, and connection ports selectively connectable to one of the plurality of circuit banks in response to the switch control signal;

d) a signal generating and measuring device having input/output ports connected to the connection ports for sending a testing signal thereto and for receiving a resulting signal therefrom, and a control/data port for receiving a test control signal to control operation of the device and for producing a reading of the resulting signal received on one of the input/output ports of the device; and e) a control unit for controlling operation of the switching system and of the signal generating and measuring device, and for remotely controlling operation of the control module of the selected one of the remote stations, the control unit having a first input/output port connected to the first modem for communication therewith, a second input/output port connected to the second modem for communication therewith, a control output connected to the control input of the switching system and a third input/output port connected to the control/data port of the signal generating and measuring device, wherein, in operation, the operator selects one of the communication links of the first communication system between the testing unit and the selected one of the remote stations by sending the command signals over the second communication system to the selected one of the remote stations via the first and second modems of the testing unit, and monitors a test procedure over the one communication link of the first communication system selected by the operator by means of the command signals sent over the second communication system from the computer to the control unit of the testing unit.

2. A testing unit according to claim 1, wherein said signal generating and measuring device comprises:

a first coupling transformer having an input connected to a first of said input/output ports of said signal generating and measuring device;

first and second amplifiers having high impedance inputs connected respectively to an output of said transformer and a second of said input/output ports of said signal generating and measuring device;

first switching means having two inputs connected respectively to outputs of said first and second amplifiers;

second switching means having an input connected to an output of said first switching means;

a third amplifier having a high impedance input connected to an output of said second switching means;

a second coupling transformer having an input connected to an output of said third amplifier, and an output connected to a third of said input/output ports of said signal generating and measuring device;

a measuring unit having an input connected to said output of said first switching means;

a signal generator having an output connected to an input of said second switching means; and a microprocessor having an input connected to said control unit, said switching means, said measuring unit and said signal generator, whereby said operator can monitor said test procedure by sending command signals to said microprocessor via said second communication system.

3. A testing unit according to claim 1, in combination with said modems and control modules situated at said remote stations, wherein each of said control modules comprises:

first switching means having an input connected in series with one of the corresponding communication links;

a first coupling transformer having an input connected to an output of said first switching means;

second switching means having an input connected to an output of said first coupling transformer;

third switching means having an input connected to an output of said second switching means;

a second coupling transformer having an input connected to an output of said third switching means;

fourth switching means having an input connected to an output of said second coupling transformer, and an output connected in series with said one communication link;

a measuring unit having an input connected to said output of said second switching means;

signal generator having an output connected to an input of said third switching means; and a microprocessor connected to the corresponding modem, said switching means, said measuring unit and said signal generator, whereby said operator can monitor a test procedure at one of said remote stations by sending command signals to the corresponding microprocessor via said second communication system.

4. A testing unit according to claim 3, in combination with said modems and control modules situated at said remote stations, wherein each of said control modules further comprises:

fifth switching means having an input connected in parallel with said one communication link;

sixth switching means having an input connected to an output of said fifth switching means, and an output connected to said one communication link; and a tap connection having an input connected to said output of said fifth switching means, and an output connected to an input of said second switching means, said microprocessor having different connections with said fifth and sixth switching means, whereby said operator can monitor additional test procedures at one of said remote stations by sending command signals to the corresponding microprocessor via said second communication system.

5. A testing unit according to claim 1, in combination with said modems and control modules situated at said remote stations, wherein each of said control modules comprises:

a first switching means having a four-connection input connected with one of the corresponding communication links, said one communication link comprising two reception wires and two transmission wires, said first switching means also comprising a two-wire input and a first two-wire output;

a first coupling transformer having an output connected to said two-wire input of said switching means;

a second coupling transformer having an input connected to said first two-wire output of said switching means;

a first variable gain amplifier having an output connected to an input of said first transformer via a resistor;

a second switching means having an output connected to an input of said first amplifier;

a signal generator having an output connected to an input of said second switching means;

a third switching means having a first input connected to said output of said first transformer via a buffer, and a second input connected to an output of said second transformer;

a second variable gain amplifier having an input connected to an output of said third switching means;

a fourth switching means having an input connected to an output of said second amplifier, and an output connected to an input of said second switching means; and a central processing unit connected to the corresponding modem, said switching means, said amplifiers and said signal generator, whereby said operator can monitor a test procedure at one of said remote stations by sending command signals to the corresponding central processing unit via said second communication system.

6. A testing unit according to claim 5, in combination with said modems and control modules situated at said remote stations, wherein each of said control modules further comprises:

a differential amplifier connected to a second two-wire output of said first switching means, and an output connected to a second input of said fourth switching means;

a sinusoidal wave detector having an input connected to said output of said fourth switching means, and an output connected to an input of said central processing unit; and an anti-aliasing filter having an input connected to said output of said fourth switching means, and an output connected to an input of said central processing unit.

7. A method for selecting and testing communication links of a first communication system interconnecting a plurality of remote stations and an intermediate station by means of a second communication system interconnecting modems located at each of the remote stations, each of the modems of the remote stations communicating with a control module located at each of the remote stations, wherein each of the control modules are connected to one of the links of the first communication system, comprising the steps of:

a) establishing a first connection for transmitting first data signals and command signals over the second communication system between a testing unit located at an intermediate station and an operator at a remote location provided with a computer and a modem connected with the computer upon command signals issued from the computer;

b) establishing a second connection for transmitting second data signals and the command signals over the second communication system between the testing unit and [a] any selected one of the remote stations upon the command signals issued from the computer, wherein, in operation, one of the communication links of the first communication system is selected between the testing unit and the selected one of the remote stations;

c) generating and sending the command signals from the computer to the testing unit via the first connection over the second communication system for initiating a test procedure over the communication link selected in the step (b);

d) sending test signals over the one communication link selected in the step (b) on the basis of the test procedure initiated in the step (c);

e) receiving result signals at the testing unit resulting from the test signals sent in the step (d);

f) measuring the result signals received in the step (e) at the testing unit; and g) sending information from the testing unit to the computer by means of the first connection over the second communication system wherein the information is representative of the result signals measured in the step (f).

8. A method according to claim 7, further comprising a step of sending command signals issued from said computer to said intermediate station via said first connection, and to said remote station that has been selected via said first and second connections, for temporarily disconnecting said communication link that has been selected from said first communication system by means of switching means present at said stations, so that said test procedure be a closed loop test procedure.

9. A method according to claim 7, wherein each of said remote stations is provided with a testing module connected to the corresponding communication links, said method comprising a step of sending command signals to the control module of the remote station that has been selected via said first and second connections to initiate a test procedure from the remote station that has been selected over said communication link that has been selected, upon commands issued from said computer.

10. A method according to claim 8, wherein each of said remote stations is provided with a testing module connected to the corresponding communication links, said method comprising a step of sending command signals to the control module of the remote station that has been selected via said first and second connections to initiate a test procedure from the remote station that has been selected over said communication link that has been selected, upon commands issued from said computer.

* * * * *